US010625710B2

(12) United States Patent
Schlaps et al.

(10) Patent No.: US 10,625,710 B2
(45) Date of Patent: Apr. 21, 2020

(54) SEAT BELT RETRACTOR WITH ADAPTIVE LOAD LIMITING

(71) Applicant: TRW Vehicle Safety Systems Inc., Washington, MI (US)

(72) Inventors: Edgar H. Schlaps, Washington, MI (US); George G. Moser, Brighton, MI (US); Adam Ostapowicz, Orchard Lake Village, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 255 days.

(21) Appl. No.: 15/327,730

(22) PCT Filed: Aug. 14, 2015

(86) PCT No.: PCT/US2015/045177
§ 371 (c)(1),
(2) Date: Jan. 20, 2017

(87) PCT Pub. No.: WO2016/025780
PCT Pub. Date: Feb. 18, 2016

(65) Prior Publication Data
US 2017/0203714 A1 Jul. 20, 2017

Related U.S. Application Data

(60) Provisional application No. 62/037,758, filed on Aug. 15, 2014.

(51) Int. Cl.
B60R 22/34 (2006.01)
B60R 22/28 (2006.01)

(52) U.S. Cl.
CPC .... *B60R 22/3413* (2013.01); *B60R 2022/282* (2013.01); *B60R 2022/288* (2013.01); *B60R 2022/289* (2013.01)

(58) Field of Classification Search
CPC .......... B60R 22/3413; B60R 2022/282; B60R 2022/288; B60R 2022/289
See application file for complete search history.

(56) References Cited

U.S. PATENT DOCUMENTS 3,178,226 A 4/1965 Bayer
6,102,439 A * 8/2000 Smithson ................ B60R 22/28
280/805

(Continued)

FOREIGN PATENT DOCUMENTS

DE 10034393 1/2002

*Primary Examiner* — Sang K Kim
(74) *Attorney, Agent, or Firm* — Tarolli, Sundheim, Covell & Tummino LLP

(57) ABSTRACT

A seat belt retractor comprises (a) a rotatable spool on which seat belt webbing is wound and (b) a load-limiting system to limit a load applied to a vehicle occupant by the webbing. The load-limiting system includes a flow control orifice through which fluid is forced when a load in excess of a predetermined load is applied to the rotatable spool by the webbing. The cross-sectional flow area of the flow control orifice is adjustable in response to unwinding of webbing from the rotatable spool prior to a vehicle crash event and ceases to be adjustable after the crash event is in progress. The load-limiting system also includes a piston in a cylinder. The piston and cylinder are operatively coupled to the spool such that rotation of the spool causes the piston to move relative to the cylinder, which movement causes fluid to be forced through the flow control orifice.

8 Claims, 14 Drawing Sheets

(56) References Cited

U.S. PATENT DOCUMENTS

| | | | |
|---|---|---|---|
| 6,129,385 A * | 10/2000 | Blackadder | B60R 22/28 |
| | | | 180/282 |
| 6,290,159 B1 * | 9/2001 | Specht | B60R 22/3413 |
| | | | 242/379.1 |
| 6,659,505 B1 | 12/2003 | Knox | |
| 2003/0094533 A1 | 9/2003 | Specht et al. | |
| 2010/0007125 A1 | 1/2010 | Jessup et al. | |

\* cited by examiner

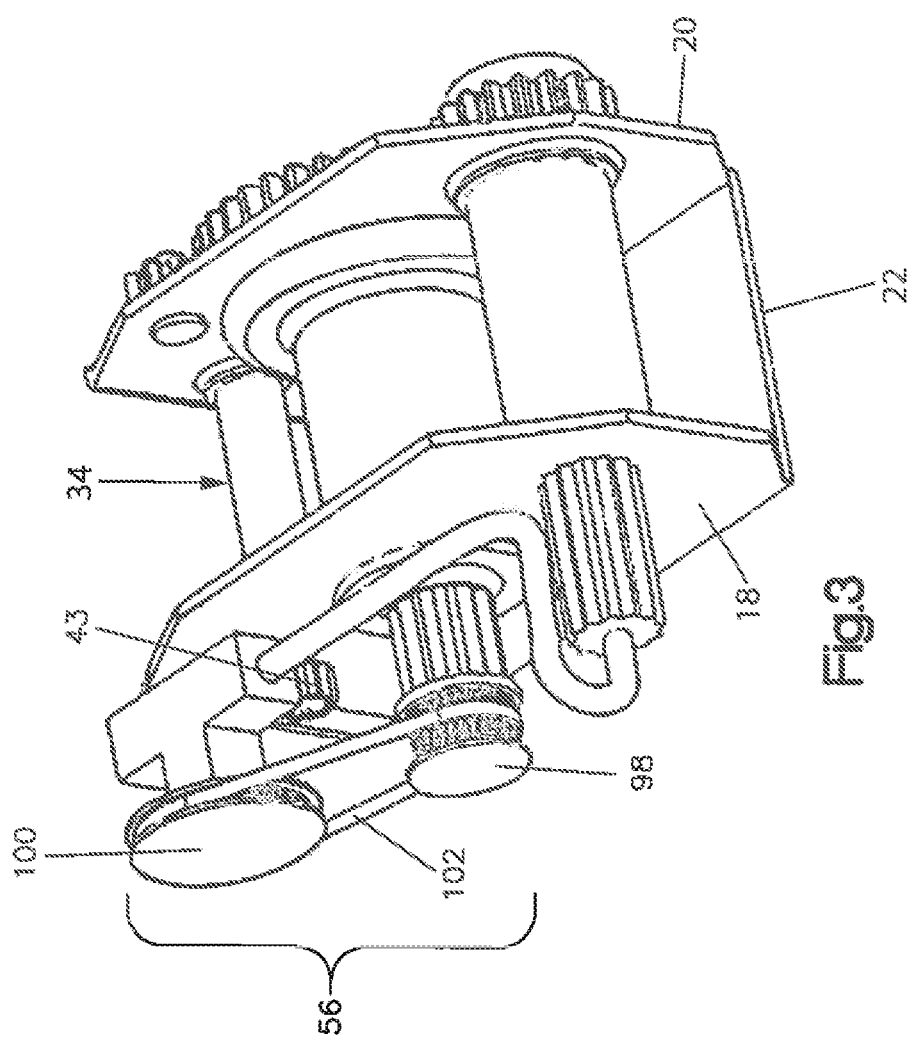

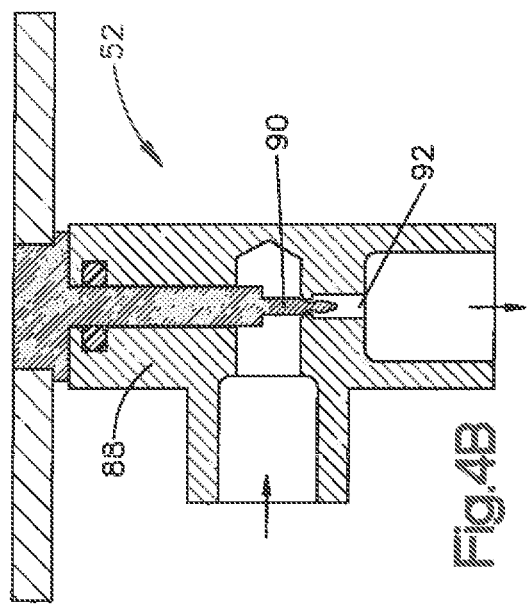
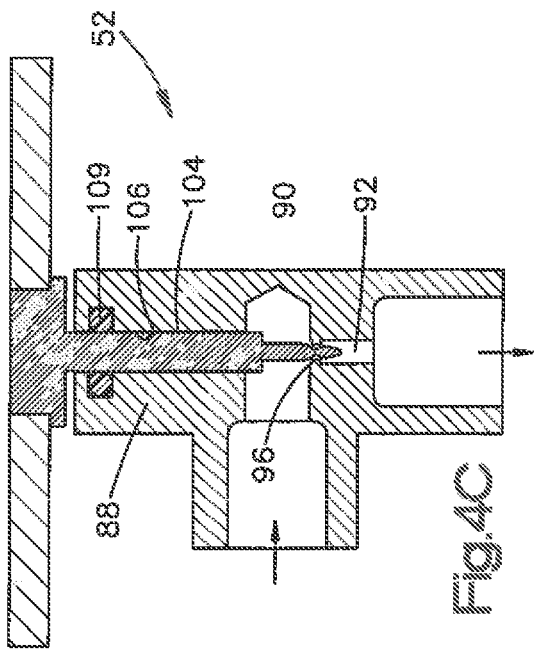
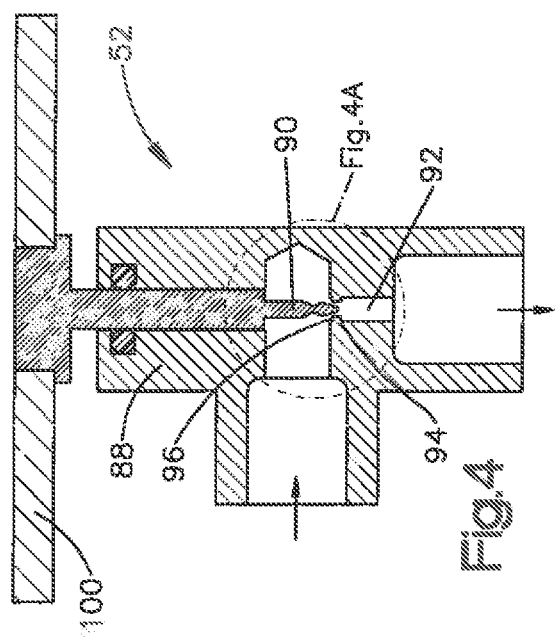
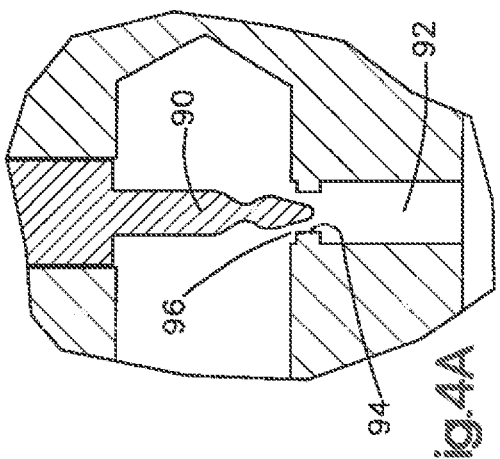

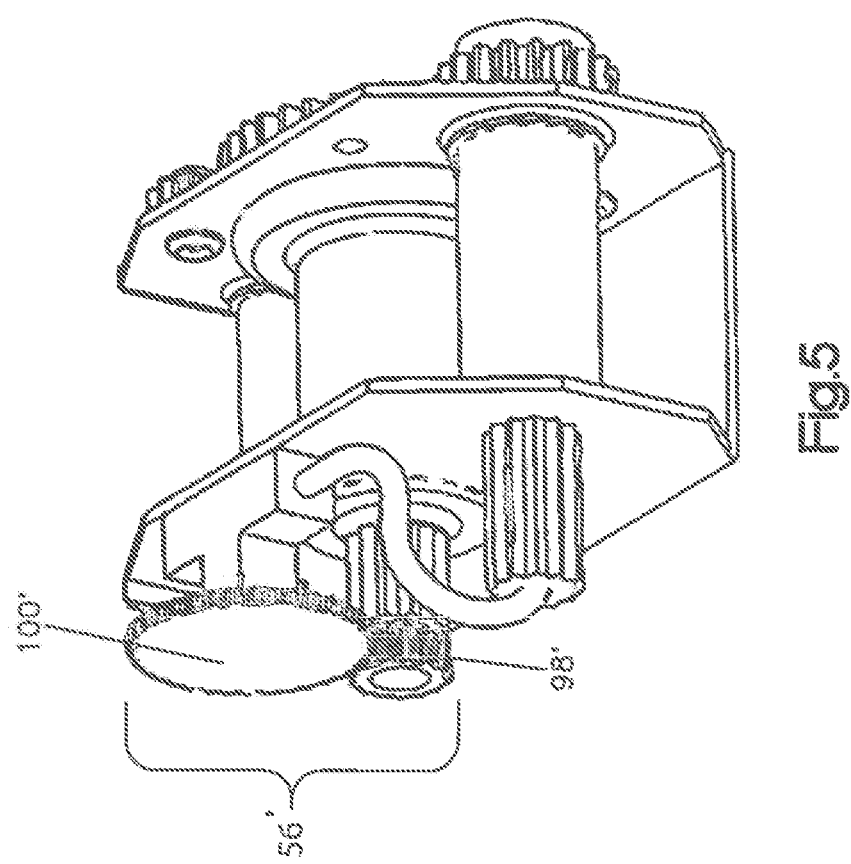

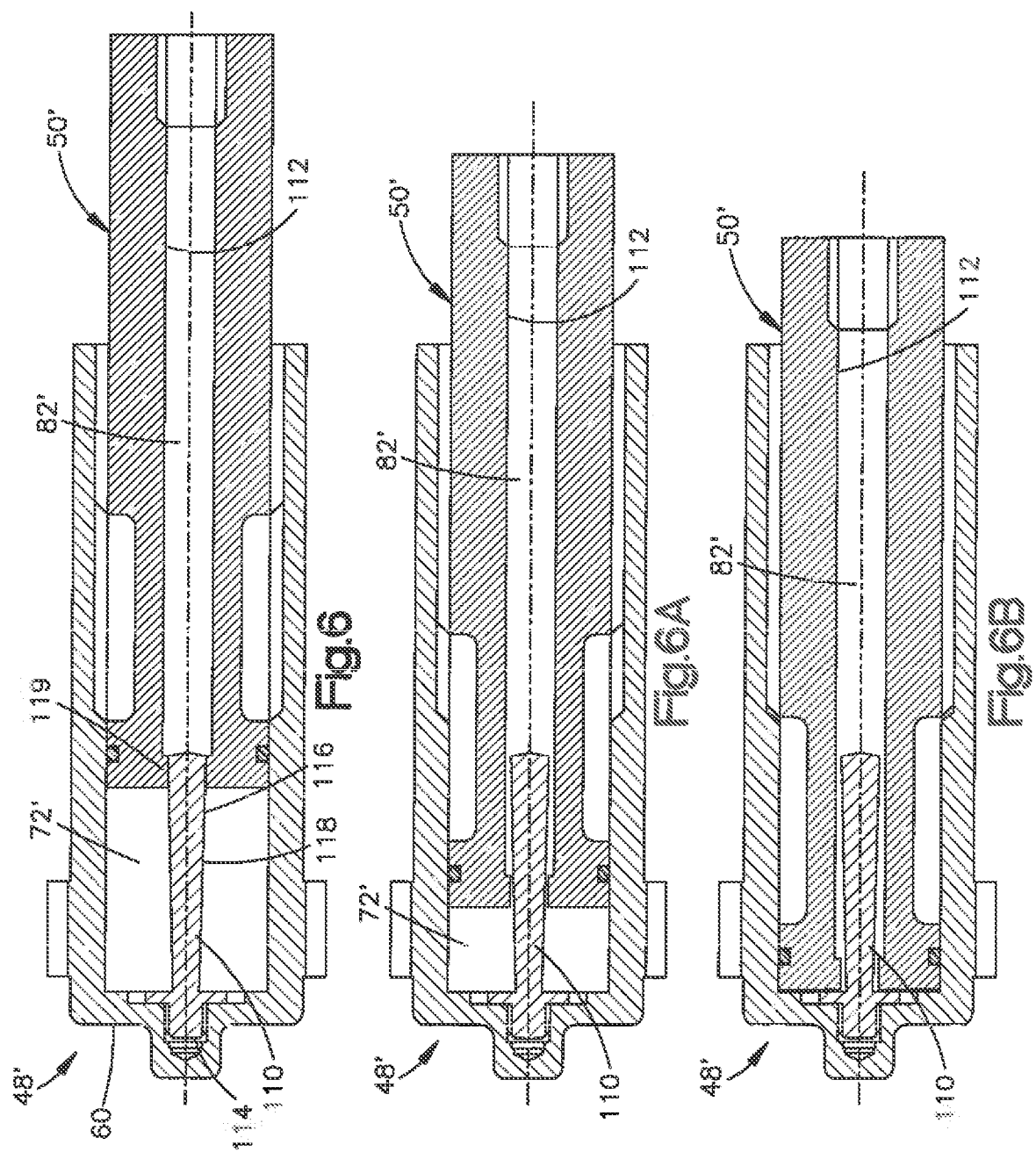

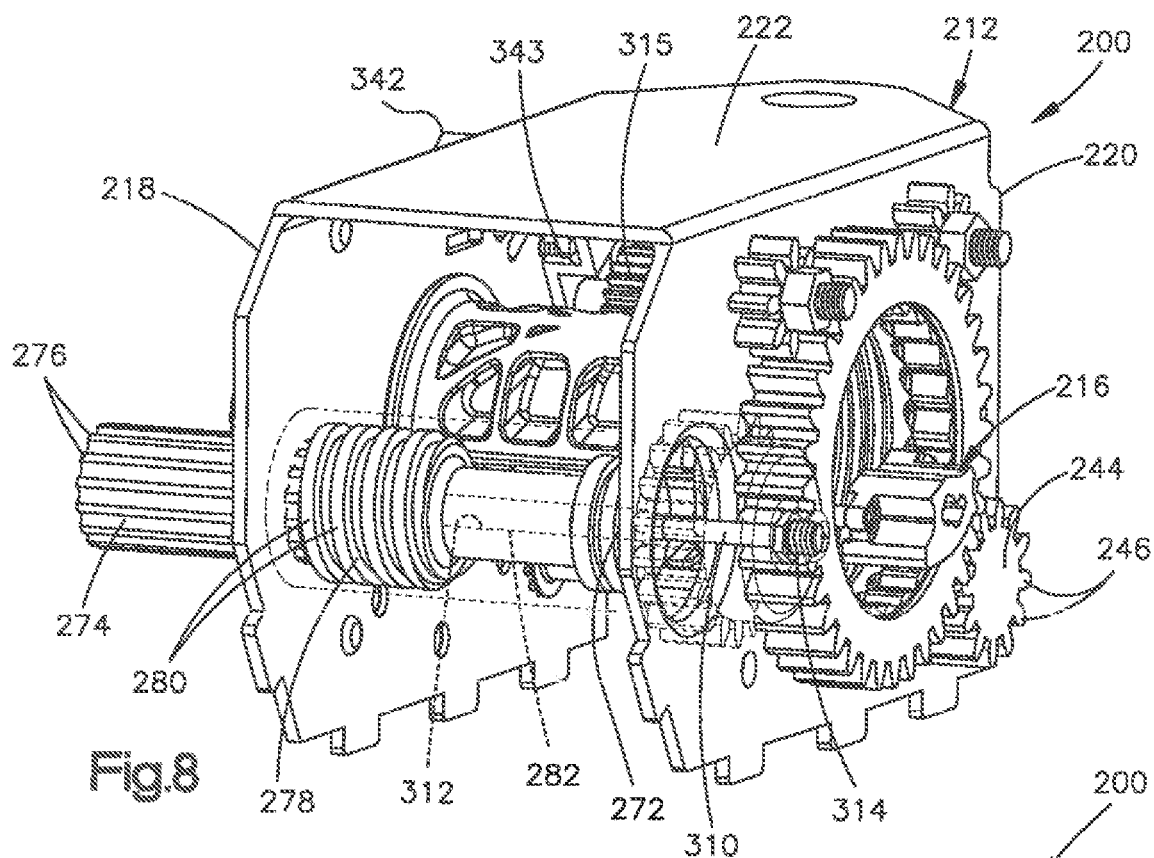
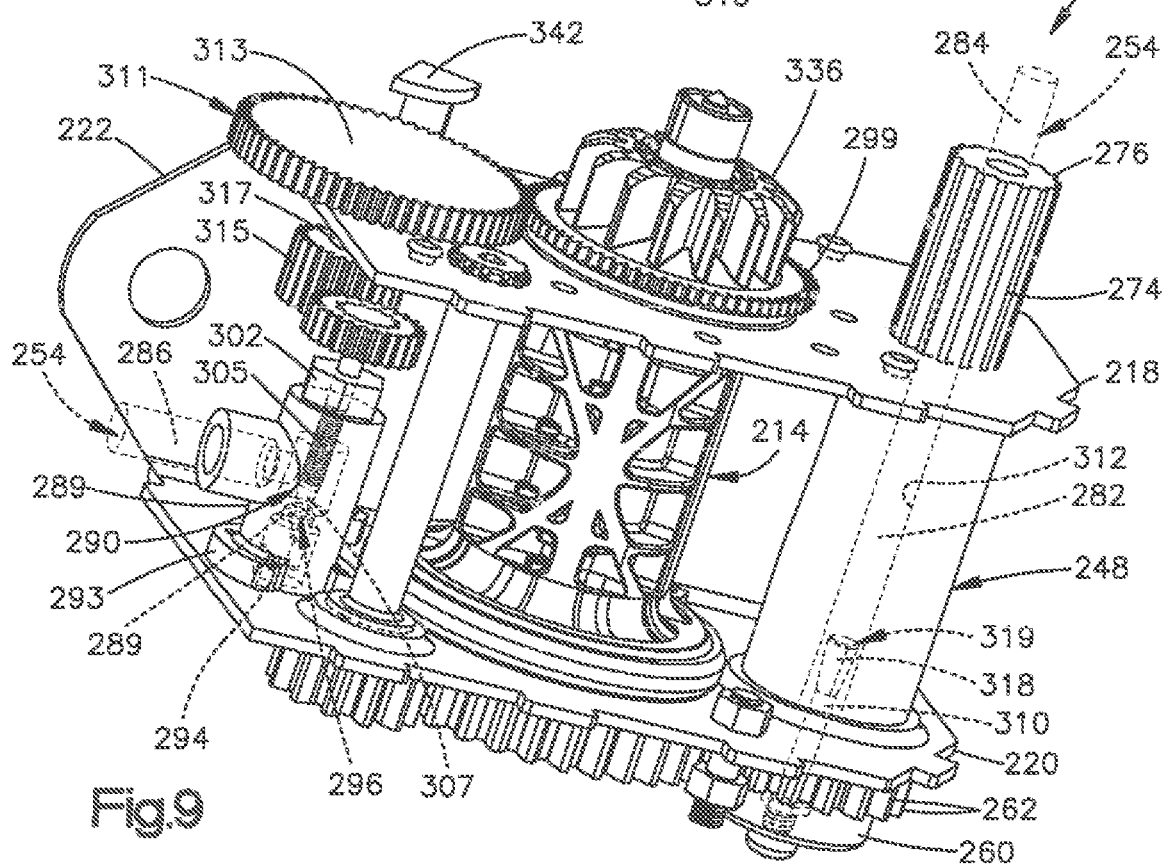

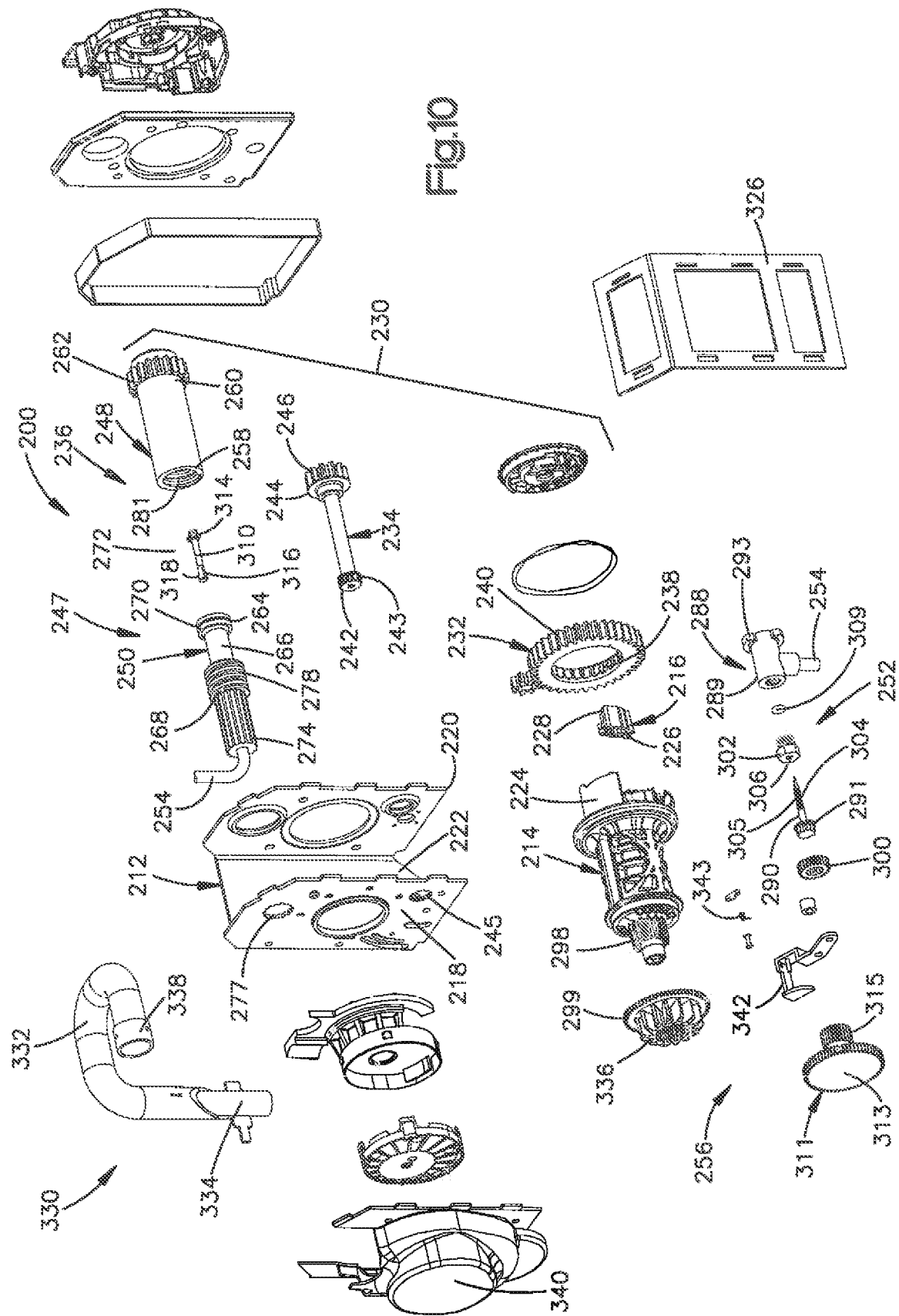

SEAT BELT RETRACTOR WITH ADAPTIVE LOAD LIMITING

RELATED APPLICATION

This application corresponds to PCT/US2015/045177, filed Aug. 14, 2015, which claims benefit of U.S. Provisional Appln. Ser. No. 62/037,758, filed Aug. 15, 2014, the subject matter of which are incorporated herein by reference in their entireties.

FIELD OF THE INVENTION

The present invention relates to a seat belt retractor with load limiting capability and, more particularly, to a seat belt retractor with load limiting capability that is adaptable to vehicle occupants of different sizes via fluid flow through an adjustable valve.

BACKGROUND OF THE INVENTION

Seat belt retractors typically have a spool on which seat belt webbing is wound and from which webbing may be unwound, for example, when a vehicle occupant extends the seat belt webbing around the occupant's body. In response to a vehicle crash condition, the spool is locked against unwinding so that the seat belt webbing will restrain the vehicle occupant in a vehicle seat. To enhance the performance of seat belt retractors over a range of occupant sizes or weights and over a range of vehicle crash conditions, mechanisms, such as torsion bars, have been added to seat belt retractors. It has also been proposed to have multiple torsion bars operably connected to a seat belt retractor and to engage the torsion bars selectively to limit the load applied to a vehicle occupant by the seat belt webbing in a vehicle crash.

SUMMARY OF THE INVENTION

The present invention is directed to a seat belt retractor with load limiting capability and, more particularly, to a seat belt retractor with load limiting capability that is adaptable to vehicle occupants of different sizes via fluid flow through an adjustable valve.

In accordance with an embodiment of the present invention, a seat belt retractor comprises (a) a rotatable spool on which seat belt webbing is wound and (b) a load-limiting system to limit a load applied to a vehicle occupant by the seat belt webbing. The load-limiting system includes a flow control orifice through which fluid is forced when a load in excess of a predetermined load is applied to the rotatable spool by the seat belt webbing. The flow control orifice has a cross-sectional flow area that is adjustable in response to unwinding of seat belt webbing from the rotatable spool prior to a crash event involving a vehicle in which the seat belt retractor is mounted. The flow control orifice ceases to be adjustable in response to unwinding of seat belt webbing from the rotatable spool after the crash event is in progress. The load-limiting system also includes a piston received in a cylinder. The piston and cylinder are operatively coupled to the rotatable spool such that rotation of the spool causes the piston to move relative to the cylinder. Movement of the piston relative to the cylinder causes fluid to be forced through the flow control orifice.

In accordance with another embodiment of the present invention, a seat belt retractor comprises (a) a rotatable spool on which seat belt webbing is wound and (b) a load-limiting system to limit a load applied to a vehicle occupant by the seat belt webbing. The load-limiting system includes a flow control orifice through which fluid is forced when a load in excess of a predetermined load is applied to the rotatable spool by the seat belt webbing. The load-limiting system includes a piston received in a cylinder. The piston is in threaded engagement with the cylinder such that relative rotation of the piston and cylinder causes axial movement of the piston relative to the cylinder. The piston and cylinder are operatively coupled to the rotatable spool such that rotation of the spool causes relative rotation of the piston and the cylinder. Axial movement of the piston relative to the cylinder causes fluid to be forced through the flow control orifice.

In accordance with a further embodiment of the present invention, a seat belt retractor comprises (a) a rotatable spool on which seat belt webbing is wound and (b) a load-limiting system to limit a load applied to a vehicle occupant by the seat belt webbing. The load-limiting system includes a torsion bar mounted such that the torsion bar is twisted when a load in excess of a first predetermined load is applied to the rotatable spool by the seat belt webbing. The load-limiting system also includes a flow control orifice through which fluid is forced when a load in excess of a second predetermined load is applied to the rotatable spool by the seat belt webbing. The load-limiting system further includes a piston received in a cylinder. The piston and cylinder are operatively coupled to the rotatable spool such that rotation of the spool causes the piston to move relative to the cylinder. Movement of the piston relative to the cylinder causes fluid to be forced through the flow control orifice.

In accordance with yet a further embodiment of the present invention, a seat belt retractor comprises (a) a rotatable spool on which seat belt webbing is wound and (b) a load-limiting system to limit a load applied to a vehicle occupant by the seat belt webbing. The load-limiting system includes a flow control orifice through which fluid is forced when a load in excess of a predetermined load is applied to the rotatable spool by the seat belt webbing. The load-limiting system also includes a piston received in a cylinder. The piston and cylinder are operatively coupled to the rotatable spool such that rotation of the spool causes the piston to move relative to the cylinder. Movement of the piston relative to the cylinder causes fluid to be forced through the flow control orifice. The load-limiting system further includes a metering orifice including a passage and a metering body projecting into the passage. The passage is formed in one of the piston and the cylinder. The metering body is formed in the other of the piston and the cylinder. The metering orifice has a cross-sectional flow area that is adjustable in response to movement of the piston relative to the cylinder. The flow control orifice is located in the piston downstream of the metering orifice such that movement of the piston relative to the cylinder causes fluid to be forced first through the metering orifice and then through the flow control orifice.

In accordance with yet still another embodiment of the present invention, a seat belt retractor comprises (a) a rotatable spool on which seat belt webbing is wound and (b) a load-limiting system to limit a load applied to a vehicle occupant by the seat belt webbing. The load-limiting system includes a flow control orifice through which fluid is forced when a load in excess of a predetermined load is applied to the rotatable spool by the seat belt webbing. The flow control orifice has a cross-sectional flow area that is adjustable in response to unwinding of seat belt webbing from the rotatable spool prior to a crash event involving a vehicle in which the seat belt retractor is mounted. The flow control orifice ceases to be adjustable in response to unwinding of seat belt webbing from the rotatable spool after the crash event is in progress. The seat belt retractor also comprises a pretensioner. The pretensioner is deployable so as to cause the flow control orifice to cease to be adjustable in response to unwinding of seat belt webbing from the rotatable spool after the crash event is in progress.

In accordance with still a further embodiment of the invention, a method for limiting a load applied to a vehicle occupant by seat belt webbing in a vehicle crash condition by forcing fluid through a flow control orifice. The method comprises the step of winding seat belt webbing on a rotatable spool. The method also comprises adjusting a cross-sectional flow area of the flow control orifice in response to unwinding of seat belt webbing from the rotatable spool prior to a crash event involving a vehicle in which the seat belt retractor is mounted. The method further comprises the step of ceasing to adjust the cross-sectional flow area of the flow control orifice in response to unwinding of seat belt webbing from the rotatable spool after the crash event is in progress. The method yet further comprises the step of limiting a load applied to a vehicle occupant by the seat belt webbing in a vehicle crash condition by forcing fluid through the flow control orifice when a load in excess of a predetermined load is applied to the rotatable spool by the seat belt webbing.

BRIEF DESCRIPTION OF THE DRAWINGS

The foregoing and other features and advantages of the present invention will become apparent to one skilled in the art upon consideration of the following description of the invention and the accompanying drawings, in which:

FIG. 3 is a third perspective view of the seat belt retractor of FIG. 1;

FIG. 4 is sectional view of fluid control valve used in the seat belt retractor of FIG. 1 showing a valve body in a first position relative to a valve passage;

FIG. 4A is an enlarged view of a portion of FIG. 4;

FIG. 4B is sectional view similar to FIG. 4 showing the valve body in a second position relative to the valve passage;

FIG. 4C is sectional view similar to FIG. 4 showing the valve body in a third position relative to the valve passage;

FIG. 5 is perspective view similar to FIG. 3 of a seat belt retractor in accordance with a second embodiment of the present invention;

FIG. 6 is sectional view of an alternate piston and cylinder used in the seat belt retractor of FIG. 1 showing a valve body in a first position relative to a valve passage;

FIG. 6A is sectional view similar to FIG. 4 showing the valve body in a second position relative to the valve passage;

FIG. 6B is sectional view similar to FIG. 4 showing the valve body in a third position relative to the valve passage;

FIG. 8 is a perspective view, in which certain parts are omitted, of a seat belt retractor in accordance with a third embodiment of the present invention;

FIG. 9 is another perspective view, in which certain parts are omitted, of the seat belt retractor of FIG. 8;

FIG. 10 is an exploded view of the seat belt retractor of FIG. 8;

DETAILED DESCRIPTION

Figure 1:
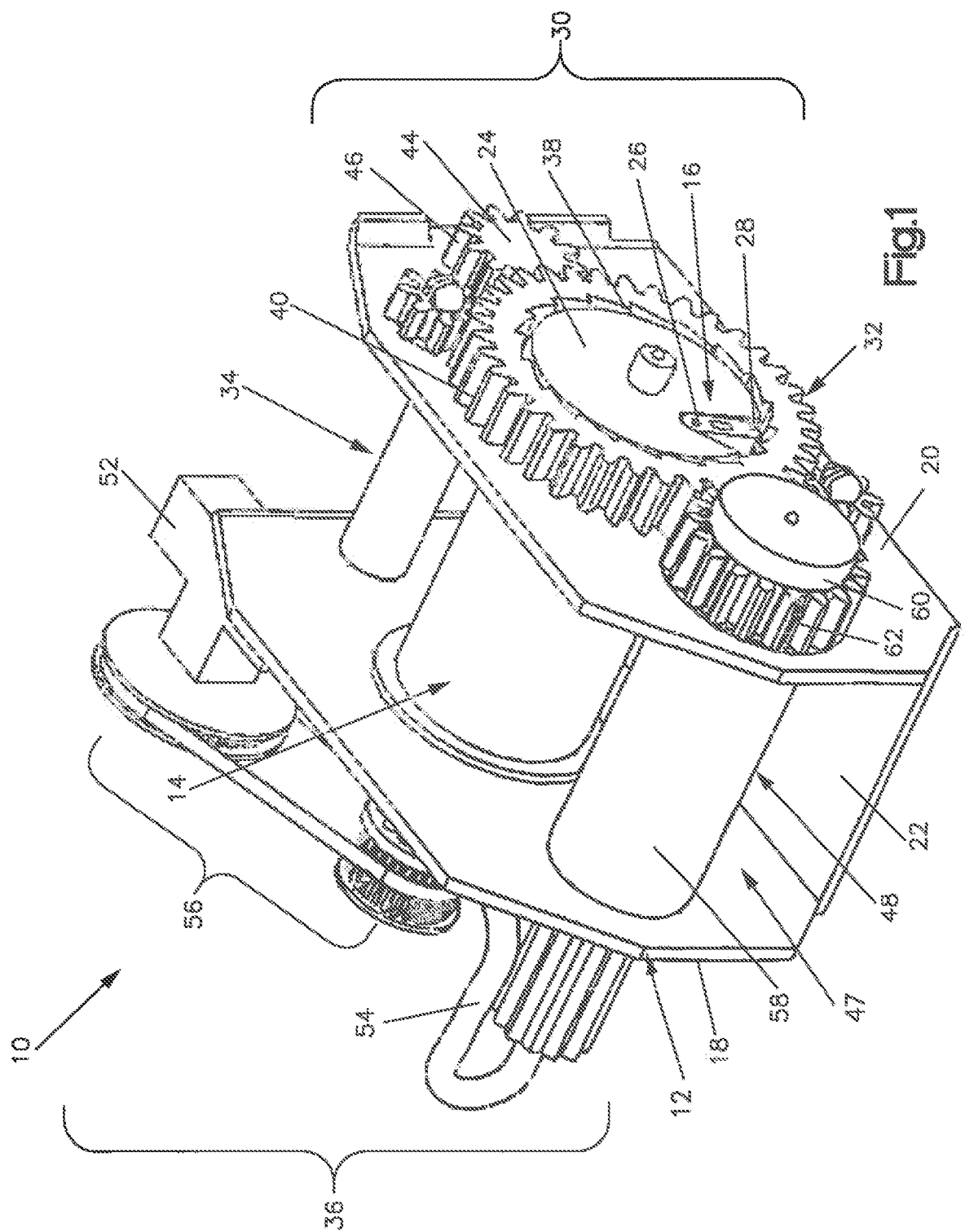
FIG. 1 is a perspective view of a seat belt retractor in accordance with a first embodiment of the present invention.
Figure 2:
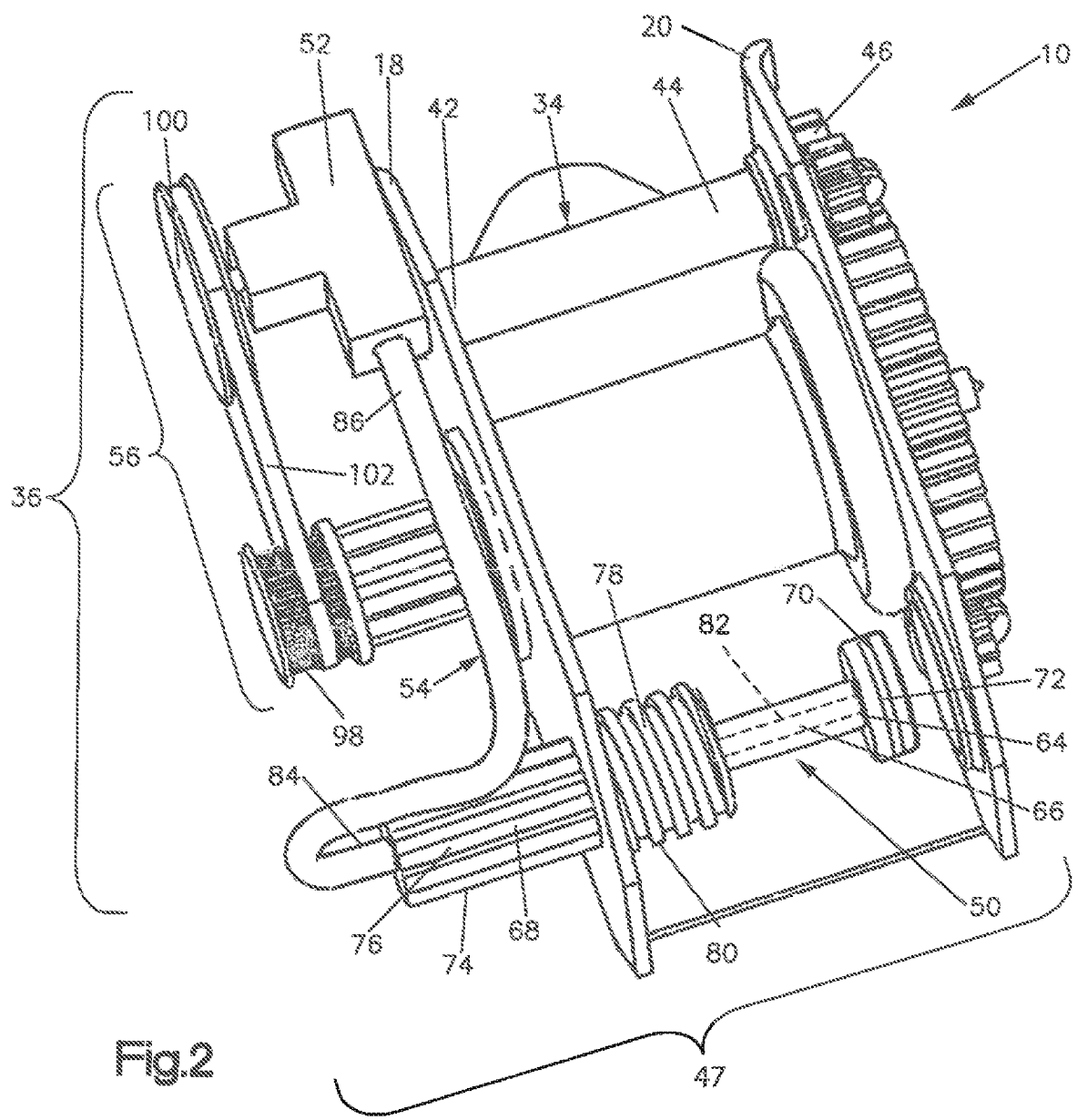
FIG. 2 is a second perspective view of the seat belt retractor of FIG. 1 with certain parts omitted.

FIGS. 1 to 3 illustrate a seat belt retractor 10, in accordance with a first example of the present invention. The seat belt retractor 10 comprises a frame 12, a spool 14, and a lock pawl 16. The frame 12 includes two side walls 18 and 20, which are laterally spaced apart from one another. The side walls 18 and 20 are joined by a base wall 22 to form a structure with a U-shaped cross-section. The spool 14 extends from one side wall 18 to the other side wall 20 and is spaced apart from the base wall 22. The spool 14 is rotatably supported on each of the side walls 18 and 20 by a shaft (not shown). The rotatable support or mounting of the spool 14 in the frame 12 permits a length of seat belt webbing (not shown) to be wound on and unwound from the spool.

A member 24 is attached to the end of the spool 14 disposed adjacent the side wall 20 of the frame 12 such that the member 24 rotates together with the spool. The lock pawl 16 is pivotally mounted on the member 24. More specifically, a radially inner end 26 of the lock pawl 16 is pivotally mounted on the member 24. A radially outer end 28 of the lock pawl 16 is shaped to engage a locking mechanism 30 to block or inhibit rotation of the spool 14. The lock pawl 16 pivots from a position in which the lock pawl does not engage the locking mechanism 30 to a position in which the lock pawl engages the locking mechanism to block or inhibit rotation of the spool.

The locking mechanism 30 comprises a locking ring gear 32, a torsion bar 34, and a hydro-dynamic system or fluid pressure assembly 36. The locking ring gear 32 is annular in shape and is mounted on an outer surface of the side wall 20 for rotation relative to the frame 12. Inner teeth 38 are disposed in a circular array around the inner circumference of the locking ring gear 32. Outer teeth 40 are disposed in a circular array around the outer circumference of the locking ring gear 32.

The inner teeth 38 of the locking ring gear 32 are positioned to be engaged by the lock pawl 16 when the lock pawl pivots radially outward. The inner teeth 38 and the outer end 28 of the lock pawl 16 are shaped such that engagement between the inner teeth and the outer end of the lock pawl will block relative movement between the lock pawl and the locking ring gear 32 in one direction of rotation (e.g., clockwise rotation of the locking ring gear as viewed in FIG. 1). The inner teeth 38 and the outer end 28 of the lock pawl 16 are also shaped such that engagement between the inner teeth and the outer end of the lock pawl will permit relative movement between the lock pawl and the locking ring gear 32 in an opposite direction of rotation (e.g., counterclockwise rotation of the locking ring gear as viewed in FIG. 1).

The outer teeth 40 of the locking ring gear 32 are positioned to engage the torsion bar 34. More specifically, the torsion bar 34 extends from one side wall 18 to the other side wall 20 of the frame 12. The torsion bar 34 is disposed parallel to and spaced apart from the spool 14. The left end portion 42 of the torsion bar 34 is immovably attached or fixed to the left side wall 18 of the frame 12, as viewed in FIG. 2. As best seen in FIG. 3, the outer surface of the left end portion 42 is formed with splines 43. The splines 43 engage a complementarily shaped surface (not shown) defining an opening (not shown) in the left side wall 18 to hold the left end portion 42 of the torsion bar 34 against rotation. The right end portion 44 of the torsion bar 34 is rotatably attached to or mounted on the right side wall 20 of the frame 12, as viewed in FIG. 2. The right end portion 44 of the torsion bar 34 also projects through the right side wall 20 of the frame 12. Gear teeth 46 are formed on the outer circumference of the right end portion 44 of the torsion bar 34. The gear teeth 46 are disposed outside the side wall 20 of the frame 12 and are positioned to be in constant meshing engagement with the outer teeth 40 of the locking ring gear 32.

As a result of the meshing engagement between the gear teeth 46 and the outer teeth 40 of the locking ring gear 32, rotational movement of the locking ring gear 32 relative to the frame 12 will effect corresponding rotational movement of the right end portion 44 of the torsion bar 34. For example, counter-clockwise movement of the locking ring gear 32, as viewed in FIG. 1, will effect clockwise movement of the right end portion 44 of the torsion bar 34. Because the left end portion 42 of the torsion bar 34 is immovably attached to or fixed to the frame 12, rotational movement of the right end portion 44 of the torsion bar relative to the frame 12 will effect twisting of the torsion bar and resistance to rotation of both the right end portion of the torsion bar and the locking ring gear 32.

The outer teeth 40 of the locking ring gear 32 are also positioned to engage the fluid pressure assembly 36. The fluid pressure assembly 36 comprises a piston-cylinder assembly 47, an adjustable fluid control valve 52, a conduit 54 connecting the cylinder to the fluid control valve, a fluid reservoir (not shown), and a drive mechanism 56 coupling the spool 14 to the fluid control valve. The piston-cylinder assembly 47 comprises a cylinder 48 and a piston 50 (FIG. 2) received in the cylinder. The cylinder 48 extends from one side wall 18 to the other side wall 20 of the frame 12. The cylinder 48 is disposed parallel to and spaced apart from the spool 14. The left end portion 58 of the cylinder 48 is rotatably attached to or mounted on the left side wall 18 of the frame 12, as viewed in FIGS. 1 and 2. The right end portion 60 of the cylinder 48 is rotatably attached to or mounted on the right side wall 20 of the frame 12, as viewed in FIGS. 1 and 2. The right end portion 60 of the cylinder 48 also projects through the right side wall 20 of the frame 12. Gear teeth 62 are formed on the outer circumference of the right end portion 60 of the cylinder 48. The gear teeth 62 are disposed outside the side wall 20 of the frame 12 and are positioned to be in constant meshing engagement with the outer teeth 40 of the locking ring gear 32.

As best seen in FIG. 2, the piston 50 includes a head portion 64, a shaft portion 66, and base portion 68. The head portion 64 of the piston 50 is the portion of the piston disposed closest to the right end portion 60 of the cylinder 48. The outer diameter of the head portion 64 is only slightly smaller than the inner diameter of the cylinder 48. To ensure a seal between the piston 50 and the cylinder 48, a piston ring 70 or similar device may be mounted in the outer circumference of the head portion 64 of the piston. The close fit between the outer circumference of the piston 50 and/or the piston ring 70 and the inner circumference of the cylinder 48 results in a fluid chamber 72 in the right end portion 60 of the cylinder. The fluid chamber 72 is sealed in the sense that fluid in the fluid chamber cannot pass by the outer circumference of the piston 50 and/or the piston ring 70. As explained below, however, fluid can pass out of the fluid chamber 72.

The shaft portion 66 of the piston 50 extends between and joins together the head portion 64 and the base portion 68. The base portion 68 of the piston 50 is disposed adjacent the left end portion 58 of the cylinder 48. A first part 74 of the base portion 68 of the piston 50, which is farthest to the left, as viewed in FIGS. 1 and 2, is formed with axially extending or longitudinally extending splines 76. The splines 76 engage a complementarily shaped surface (not shown) defining an opening (not shown) in the left side wall 18 of the frame 12 to hold the base portion 68 of the piston 50 and the piston as a whole against rotation. A second part 78 of the base portion 68 of the piston 50, which is located to the right of the first part 74, as viewed in FIGS. 1 and 2, is formed with screw threads 80. The threads 80 engage mating threads (not shown) formed on the inner circumference of the left end portion 58 of the cylinder 48. To assemble the piston 50 and the cylinder 48, the head portion 64 of the piston is inserted into an open end of the left end portion 58 of the cylinder. When the threads 80 on the outer circumference of the base portion 68 of the piston 50 contact the mating threads (not shown) on the inner circumference of the left end portion 58 of the cylinder 48, the piston and cylinder are twisted relative to one another so that the piston is effectively screwed into the cylinder.

As shown in dashed lines in FIG. 2, a passage 82 extends axially through the head portion 64, the shaft portion 66, and the base portion 68 of the piston 50. Fluid in the fluid chamber 72 can flow through the head portion 64, the shaft portion 66, and the base portion 68 of the piston 50 and thus pass out of the fluid chamber. The end of the passage 82 at the left end of the base portion 68 of the piston 50 is fluidly connected to or in fluid communication with a first end portion 84 of the conduit 54. Fluid from the fluid chamber 72 may, therefore, flow into the conduit 54.

The opposite second end portion 86 of the conduit 54 is fluidly connected to or in fluid communication with the fluid control valve 52. A check valve or burst disc (not shown) may be placed between the second end portion 86 of the conduit 54 and the fluid control valve 52 to help retain fluid in the fluid chamber 72 prior to actuation of the fluid pressure assembly 36. As best shown in FIGS. 4 to 6, the fluid control valve 52 includes a valve housing 88 and a valve spool or valve body 90. The valve body 90 moves in a valve passage 92 in the valve housing 88 to control the flow of fluid through the fluid control valve 52. The valve body 90 has an outer surface with a specially shaped contour, as best shown in FIG. 4A. The valve passage 92 is defined by a surface 94 of the valve housing 88. The surface 94 also has a specially shaped contour. Together, the outer surface of the valve body 90 and the surface 94 of the valve housing define a flow control orifice 96.

The valve body 90 is movable from a first position (not shown) in the valve passage 92 to a second position, which is shown in FIG. 4B, in the valve passage. In the first position of the valve body 90, the flow control orifice 96 is at or near its maximum cross-sectional flow area and the valve passage 92 is entirely or substantially open. In the second position of the valve body 90, the flow control orifice 96 has no cross-sectional flow area and the valve passage 92 is entirely closed or occluded by the valve body. As the valve body 90 moves from the first position to the second position, the cross-sectional flow area of the flow control orifice 96 varies in accordance with contours of the outer surface of the valve body and the surface 94 defining the valve passage 92, as indicated, for example, by the intermediate position shown in FIG. 4C. Although the flow control orifice 96 and the valve passage 92 may be incrementally closed off as the valve body 90 moves from the first position to the second position, the shapes of the contoured outer surface of the valve body and the surface 94 may provide the flow control orifice with a cross-sectional flow area that increases and decreases in various sequences and increments as valve body 90 moves from the first position to the second position and assumes different positions within the valve passage 92.

Fluid from the fluid chamber 72 may, therefore, flow through the conduit 54 into the fluid control valve 52. Within the fluid control valve 52, the fluid may flow through the valve passage 92 past the valve body 90. After passing through the fluid control valve 52, the fluid may flow into a reservoir (not shown). The extent to which the valve body 90 occludes or blocks the valve passage 92 in the fluid control valve 52, together with the pressure and/or flow rate of the fluid, will determine the extent to which the fluid may flow through the fluid control valve and the extent to which there will be resistance to such fluid flow through the fluid control valve.

The position of the fluid control valve 52 relative to other components of the retractor 10 is determined, in part, by the space available. As shown in FIGS. 1 and 2, the fluid control valve 52 is mounted on the outward facing surface of the side wall 18 adjacent the left end portion 42 of the torsion bar 34. At the same time, the fluid control valve 52 must be positioned such that the drive mechanism 56 can couple the fluid control valve to the spool 14. As shown in FIGS. 1 and 2, the drive mechanism 56 comprises a splined or toothed extension 98 on the spool 14, a toothed drive wheel 100 connected to the fluid control valve 52, and a toothed drive belt 102 extending in a loop around the toothed extension and the toothed drive wheel. The use of the toothed drive belt 102 helps to ensure that the drive belt does not slip or move lengthwise relative to either the toothed extension 98 or the toothed drive wheel 100. The toothed extension 98 is connected to the spool 14 such that the toothed extension and the spool rotate together. The toothed extension 98 also projects away from the outwardly facing surface of the side wall 18 of the frame 12. The toothed drive wheel 100 is connected to one end of the valve body 90.

The drive mechanism 56 transmits rotational movement of the spool 14 to the fluid control valve 52 and, more particularly, to the valve body 90 within the fluid control valve. The toothed drive wheel 100 is connected to one end of the valve body 90. The valve body 90 has a threaded outer surface 104 that engages a threaded inner surface 106 of the valve housing 88. Due to the threaded connection between the threaded surfaces 104 and 106, rotational movement of the valve body 90 produces axial movement of the valve body within the valve housing 88 and within the valve passage 92. Movement of the spool 14 thus effects movement of the valve body 90 within the valve passage 92 in the fluid control valve 52 to adjust the cross-sectional flow area of the flow control orifice 96. An O-ring or other seal member 109 seals the interface between the valve housing 88 and an end portion of the valve body 90 at a location adjacent the toothed drive wheel 100 and spaced from the threaded surfaces 104 and 106.

In use, when a vehicle occupant (not shown) grasps an available portion of the seat belt webbing (not shown) that is wound on the spool 14 of the retractor 10 and pulls webbing from the retractor in order to don the seat belt, the webbing unwinds from the spool and rotates the spool. Because the drive mechanism 56 is directly connected to the spool 14, rotation of the spool and thus the toothed extension 98 effects movement of the toothed drive belt 102. Movement of the toothed drive belt 102, in turn, causes rotation of the toothed drive wheel 100. Rotation of the toothed drive wheel 100 effects movement of the valve body 90 within the fluid control valve 52. The initial unwinding of the seat belt webbing (not shown) from the spool 14 when the occupant dons the seat belt thus establishes the starting position of the valve body 90 within the valve passage 92 in the fluid control valve 52 and the initial cross-sectional flow area of the flow control orifice 96. The initial extension or unwinding the seat belt webbing (not shown) will vary in accordance with the size (e.g., stature, girth, weight) of the occupant. FIG. 4 illustrates an initial position of the valve body 90 for a relatively small occupant, as determined by a relatively small payout of the seat belt webbing. FIG. 4C illustrates an initial position of the valve body 90 for a larger occupant, as determined by the greater payout of the seat belt webbing.

After the seat belt has been donned by the vehicle occupant (not shown), subsequent low speed extension and retraction movements of the seat belt webbing in a non-crash condition of the vehicle will produce rotational movements of the spool 14 and consequent adjustments of the position of the valve body 90 within the valve passage 92 in the fluid control valve 52. In a crash condition of the vehicle, a vehicle inertia sensor (not shown), such as a known ball sensor, such as shown, for example, in U.S. Pat. No. 5,495,994, or a webbing sensor (not shown) will detect either a rapid deceleration of the vehicle or a rapid acceleration of the seat belt webbing as the occupant's body moves forward and extends or unwinds the seat belt webbing, respectively. The vehicle inertia sensor or the webbing sensor will cause the lock pawl 16 of the retractor 10 to pivot radially outward and engage the inner teeth 38 of the locking ring gear 32.

When the radially outer end 28 of the lock pawl 16 engages one of the inner teeth 38 of the locking ring gear 32, the locking ring gear will rotate together with the spool 14. As the locking ring gear 32 rotates, the meshing engagement between the outer teeth 40 of the locking ring gear and the gear teeth 46 on the right end portion 44 of the torsion bar 34 causes the torsion bar to twist and to resist rotation of the locking ring gear and the spool 14.

In addition, as the locking ring gear 32 rotates, the meshing engagement between the outer teeth 40 of the locking ring gear and the gear teeth 62 on the right end portion 60 of the cylinder 48 causes the cylinder to rotate. Rotation of the cylinder 48 causes the piston 50 to move to the right, as viewed in FIGS. 1 and 2, due to the engagement between the threads 80 on the base portion 68 of the piston 50 and the mating threads (not shown) formed on the inner circumference of the left end portion 58 of the cylinder. Movement of the piston 50 to the right in the cylinder 48 causes reduction in the volume of the fluid chamber 72. As the volume of the fluid chamber 72 is reduced, the fluid in the fluid chamber is forced out of the fluid chamber through the passage 82 that extends axially through the head portion 64, a shaft portion 66, and base portion 68 of the piston 50. The fluid forced from the fluid chamber 72 flows through the conduit 54 into the fluid control valve 52.

Within the fluid control valve 52, the fluid encounters the valve body 90 in the valve passage 92. Depending on the extent to which the valve body 90 occludes or blocks the valve passage 92 and, potentially, the external shape of the valve body, both of which will help to determine or establish the cross-sectional flow area of the flow control orifice 96 in the fluid control valve 52, and depending on the velocity or speed with which the fluid is being forced to flow through the flow control orifice, the fluid control valve will provide greater or lesser back-pressure to resist the flow of fluid through the flow control orifice. The extent of the resistance to fluid flow provided by the fluid control valve 52 will determine the extent to which there is resistance to movement of the piston 50 within the cylinder 48 and the extent to which there is resistance to rotation of the cylinder and rotation of the locking ring gear 32. In this regard, it should be recognized that an increase in fluid velocity through the control orifice will produce a geometric (e.g., quadratic), rather than linear, increase in resistance to movement of the piston 50, the cylinder 48, and the locking ring gear 32.

The resistance to rotation or the reaction load or force provided by the fluid pressure assembly 36 is additive to the resistance to rotation or loads provided by the torsion bar 34. The torsion bar 34, in effect, provides a constant baseline or minimum level of resistance or load, while the fluid pressure assembly provides higher resistances or loads. In addition, because the initial position of the valve body 90 within the fluid control valve 52 is determined by the initial webbing payout or extent to which the webbing is initially unwound from the spool 14, the valve body is initially positioned in accordance with the size (e.g., stature, girth, weight) of the occupant. Subsequent movement of the valve body 90 in a vehicle crash condition and consequent adjustment of the cross-sectional flow area of the flow control orifice 96 can therefore be adapted, through the shape and dimensions of the valve body and the passage in which the valve body moves, to accommodate or be responsive to the size of the occupant. Together, the fluid control valve 52 and the torsion bar 34 help to limit a load applied to a vehicle occupant by the seat belt webbing when a vehicle (not shown) in which the retractor 10 is mounted experiences a crash or vehicle crash condition.

Although any suitable fluid may be used in the fluid pressure assembly 36, automotive brake fluid is one suitable fluid. Automotive brake fluid has a long useful life, resists rust, has a relatively constant viscosity over temperature ranges normally encountered in automotive applications, and provides lubricity to facilitate operation of the mechanical components of the fluid pressure assembly 36.

In addition, while the drive mechanism 56 comprises a toothed extension 98 on the spool 14, a toothed drive wheel 100 connected to the fluid control valve 52, and a toothed drive belt 102 extending in a loop around the toothed extension and the toothed drive wheel, any suitable drive mechanism with any suitable components may be used. For example, FIG. 5 illustrates an alternative drive mechanism 56', in which the toothed drive belt 102 is eliminated, and the toothed extension 98' on the spool 14 directly engages the toothed drive wheel 100' connected to the fluid control valve 52.

Further, while it is contemplated that the locking ring gear 32 will accommodate and carry all of the loads applied to it, idler gears 108 may also be employed at one or locations around the circumference to the locking ring gear to help inhibit lateral movement or deformation of the locking ring gear. Such idler gears 108 are rotatably mounted on the frame 12 and meshingly engage the outer teeth 40 on the locking ring gear 32 to provide stable supports against lateral movement or deformation of the locking ring gear.

As still a further alternative, the passage 82 through the piston 50 may have configurations other than an elongated cylinder. For example, it may be desirable, in order to tailor the performance of the fluid pressure assembly 36 to provide the passage 82 with a configuration that will accommodate a member similar to the valve body 90. Because the piston 50 moves during operation of the fluid pressure assembly 36, a member within the passage 82 would be stationary and could be mounted, for example, to an interior surface of the right hand end portion 60 of the cylinder 48 such that it projected into the passage 82. By specially configuring the outer surface of such a member and the inner surface of the piston 50 defining the passage 82, the flow of fluid through the passage 82 could be affected in a manner analogous to the manner in which fluid flow through the flow control orifice 96 is affected.

An example alternate embodiment of a piston and cylinder such as described in the preceding paragraph is shown in FIGS. 6 through 6B. As shown, a piston 50' is received in a cylinder 48'. The construction of the piston 50' is substantially the same as the construction of the piston 50, except for the passage 82. Similarly, the construction of the cylinder 48' is substantially the same as the construction of the cylinder 48, except for the addition of a metering pin or valve pin 110. In the piston 50', an axially extending cylindrical inner surface 112 of the piston defines the passage 82' that extends through the length of the piston. The passage 82' receives the valve pin 110. A first end portion 114 of the valve pin 110 is connected to an inner surface of the right end portion 60 of the cylinder 48'. The axially opposite second end portion 116 of the valve pin 110 is received in the passage 82'. An outer surface 118 of the second end portion 116 of the valve pin 110 is tapered such that the largest outer diameter of the valve pin is farthest from the first end portion 114 and the smallest outer diameter of the valve pin is closest to the first end portion 114.

FIGS. 6 to 6B illustrate an initial starting position of the valve pin 110 within the passage 82' in FIG. 6, an intermediate position of the valve pin relative to the passage in FIG. 6A, and a position of valve pin relative to the passage in which the fluid chamber 72' has essentially no remaining volume being illustrated in FIG. 6B. The tapered outer surface 118 of the valve pin 110 and the inner surface 112 of the piston 50' define between them a metering orifice or flow control orifice 119. The flow control orifice 119 provides a further mechanism, in addition to the fluid control valve 52 and the torsion bar 34, to help to limit a load applied to a vehicle occupant by the seat belt webbing when a vehicle (not shown) in which the retractor 10 is mounted experiences a crash or vehicle crash condition. Other shapes for the outer surface 118 and the inner surface 112 are possible and may be used to provide a desired fluid flow through the passage 82'.

Figure 7:
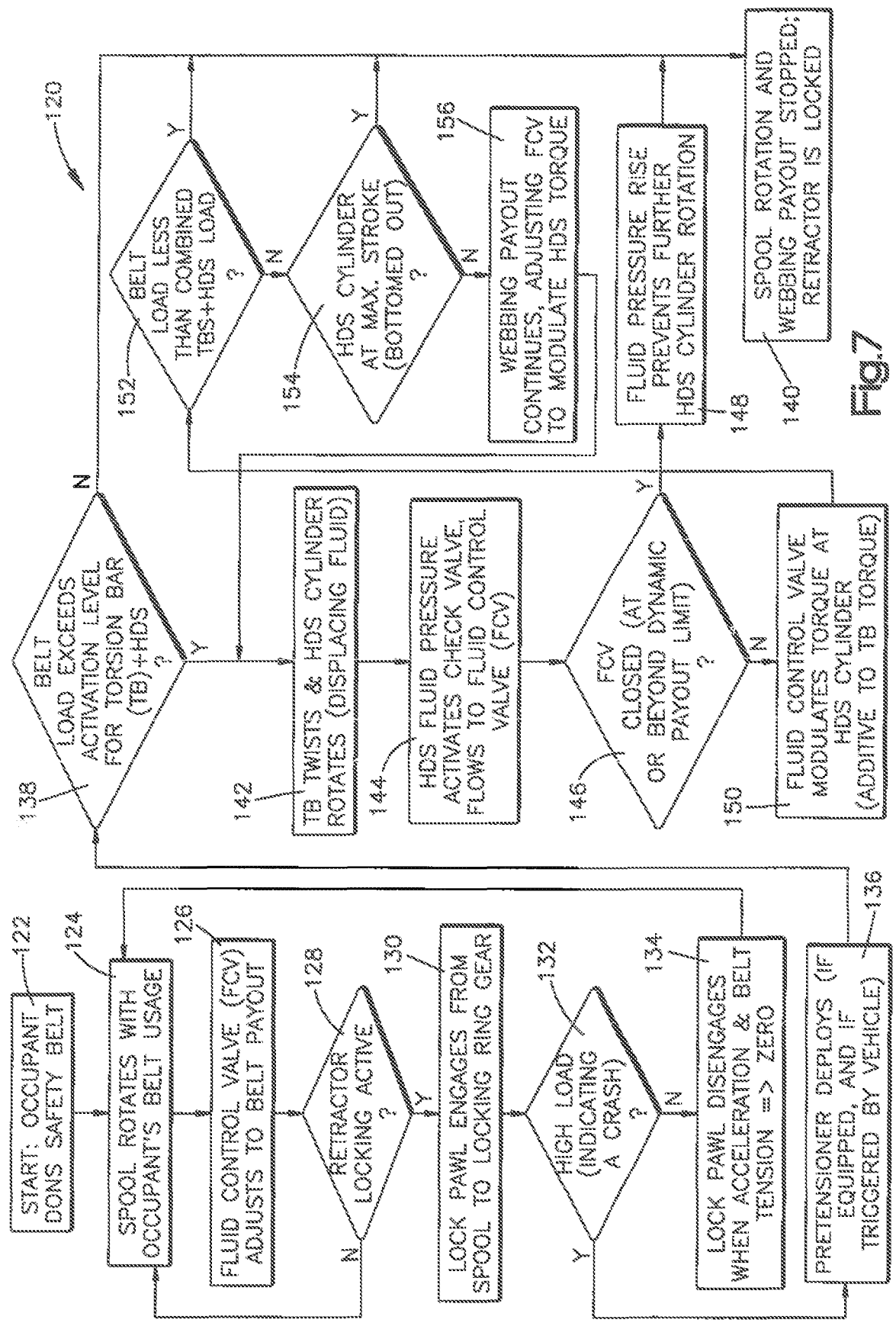
FIG. 7 is a flow chart illustrating a method of operating a seat belt retractor, such as the seat belt retractor shown in FIG. 1, in accordance with the present invention.

FIG. 7 is a flow chart detailing a method 120 of operation of a retractor such as the retractor 10 shown in FIGS. 1 through 3. The method 120 starts at block 122 in which a vehicle occupant dons the safety belt or seat belt. The method 120 proceeds to step 124 in which the spool, such as spool 14, rotates in response to the vehicle occupant's extension of the seat belt when donning the seat belt. In step 126, a fluid control valve, such as fluid control valve 52, responds to the initial extension of the seat belt so as to establish the initial position of a valve body, such as valve body 90, within the fluid control valve. In step 128, if a locking mechanism, such as lock pawl 16, for the retractor is not active, the method 120 returns to step 124, in which the spool moves in response to movement of the seat belt webbing. If a locking mechanism, such as lock pawl 16, for the retractor is active, the method 120 proceeds from step 128 to step 130, in which the locking mechanism for the retractor moves to an active position, such as the lock pawl 16 engaging the locking ring gear 32.

From step 130, a determination is made in step 132 as to whether there is a load on the spool and the locking mechanism of sufficient magnitude that a vehicle crash condition is indicated. If no vehicle crash condition is determined in step 132, the method 120 moves on to step 134, in which the locking mechanism moves from an active or engaged position to an inactive or disengaged position. With regard to step 132, "a determination is made" in the sense that the retractor responds to vehicle deceleration and/or belt tension or loads. In addition, the locking mechanism moves to an inactive or disengaged position only after the vehicle deceleration and belt tension have dropped below predetermined threshold values. From step 134, the method 120 returns to step 124, in which the spool moves in response to movement of the seat belt webbing.

If the determination in step 132 is that the load on the spool and the locking mechanism of sufficient magnitude to indicate a vehicle crash condition, the method 120 moves on to step 136. In step 136, an optional pretensioner is deployed, if the retractor is equipped with such a pretensioner. The method 120 then proceeds to step 138. At step 138, a determination is made as to whether there is a load on the seat belt, the spool, and the locking mechanism of sufficient magnitude that load-limiting via a torsion bar, such as torsion bar 34, and a hydro-dynamic load limiting system, such as fluid pressure assembly 36, is indicated. With regard to step 138, "a determination is made" in the sense that the retractor responds to belt tension or loads. If no load limiting is determined in step 138, the method 120 moves on to step 140, in which the spool rotation and webbing payout is stopped, and the retractor is locked. As implemented in the retractor 10, if the load applied to the locking gear ring 32 by the seat belt webbing acting through the spool 14 is not sufficient to overcome the inherent resistance to twisting of the torsion bar 34, the locking ring gear does not rotate and the engagement between the lock pawl 16 and the locking ring gear stops rotation of the spool and payout or extension of the seat belt webbing.

If the determination in step 138 is that load limiting is indicated, the method 120 moves on to step 142. At step 142, the torsion bar, such as torsion bar 34, twists and the hydro-dynamic system, such as fluid pressure assembly 36, begins to displace fluid. As implemented in the retractor 10, if the load applied to the locking gear ring 32 by the seat belt webbing acting through the spool 14 is sufficient to overcome the inherent resistance to twisting of the torsion bar 34, the locking ring gear rotates. Rotation of the locking ring gear 32 causes rotation of both (a) the right end portion 44 of the torsion bar 34, which initiates twisting of the torsion bar, and (b) the right end portion 60 of the cylinder 48, which initiates movement of the piston 50 toward right in the cylinder and consequent reduction of the volume of the fluid chamber 72 and flow of fluid out of the fluid chamber. From step 142, the method 120 moves on to step 144, in which the fluid flowing out of the fluid chamber 72 flows into the conduit 54, opens a one-way check valve or a burst disc (if used), and flows into the fluid control valve 52.

From step 144, the method 120 proceeds to step 146. In step 146, a determination is made as to whether or not the fluid control valve is closed. With regard step 146, "a determination is made" in the sense that the fluid control valve either has or does not have additional travel before the flow control orifice is closed. If there is no additional travel and the flow control orifice is fully occluded or closed, and the fluid control valve is thus closed, the method 120 proceeds to step 148. In step 148, the closed fluid control valve stops fluid flow out of the fluid chamber in the cylinder. The pressure in the fluid chamber rises and further movement of the piston is blocked. As movement of the piston is blocked, rotation of the cylinder is also blocked. Because the cylinder cannot rotate, rotation of the locking ring gear is blocked. From step 148, the method 120 proceeds to step 140, in which the spool rotation and webbing payout is stopped, and the retractor is locked.

In step 146, if a determination is made that the fluid control valve, such as the fluid control valve 52, is not closed and the flow control orifice is also not closed, the method 120 proceeds to step 150. In step 150, the fluid control valve continues to modulate the fluid flow out of the fluid chamber in the cylinder and, consequently, the pressure in the fluid chamber resisting movement of the piston and rotation of the cylinder. From step 150, the method 120 proceeds to step 152. In step 152, a determination is made as to whether the load on the seat belt webbing is less than the load limit level that can be provided by the torsion bar and the hydro-dynamic system. In other words, the torsion bar and the hydro-dynamic system are intended to limit the load on the seat belt webbing by allowing the webbing to continue to pay out while offering resistance to the webbing payout. Once the load on the seat belt webbing is less than the load necessary to actuate the torsion bar and the hydro-dynamic system, the load has, in effect, been limited and further operation of the torsion bar and the hydro-dynamic system is not required. Thus, in step 152, if a determination is made that the load on the seat belt webbing is less than the load limit level that can be provided by the torsion bar and the hydro-dynamic system, the method 120 proceeds to step 140, in which the spool rotation and webbing payout is stopped, and the retractor is locked.

If, on the other hand, a determination is made in step 152 that the load on the seat belt webbing is greater than the load limit level that can be provided by the torsion bar and the hydro-dynamic system, the method 120 proceeds to step 154. In step 154, a determination is made as to whether the valve body of the fluid pressure assembly, such as the valve pin 310 of the fluid pressure assembly, such as the valve pin 110 of the fluid pressure assembly 36, has reached the end of its possible range of movement, as shown, for example, in FIG. 6B. If the valve body has reached the end of its possible range of travel, the method 120 proceeds to step 140, in which the spool rotation and webbing payout is stopped, and the retractor is locked. If the valve body has not reached the end of its possible range of travel, the method 120 proceeds to step 156, in which the fluid control valve continues to modulate the fluid flow out of the fluid chamber in the cylinder and, consequently, the pressure in the fluid chamber resisting movement of the piston and rotation of the cylinder. From step 156, the method 120 returns to step 142.

FIGS. 8 to 10 illustrate a seat belt retractor 200, in accordance with a third example of the present invention. The seat belt retractor 200 is similar to the seat belt retractor 10 in many respects. In the example embodiment of FIGS. 8 to 10, components of the seat belt retractor 200 that correspond to components of the seat belt retractor 10 are identified with the same reference numerals increased by 200.

The retractor 200 comprises a frame 212, a spool 214, and a lock pawl 216. The frame 212 includes two side walls 218 and 220, which are laterally spaced apart from one another. The side walls 218 and 220 are joined by a base wall 222 to form a structure with a U-shaped cross-section. The spool 214 extends from one side wall 218 to the other side wall 220 and is spaced apart from the base wall 222. The spool 214 is rotatably supported on each of the side walls 218 and 220 by a shaft (not shown). The rotatable support or mounting of the spool 214 in the frame 212 permits a length of seat belt webbing (not shown) to be wound on and unwound from the spool. To help ensure that the frame 212 maintains its intended shape during a crash condition of a vehicle (not shown) in which the retractor 200 is installed, a cross-brace or brace member 326 extends from one side wall 218 to the other side wall 220 at a location opposite the base wall 222 and is securely attached to both side walls.

A member 224 is attached to the end of the spool 214 disposed adjacent the side wall 220 of the frame 212 such that the member 224 rotates together with the spool. The lock pawl 216 is pivotally mounted on the member 224. More specifically, a radially inner end 226 of the lock pawl 216 is pivotally mounted on the member 224. A radially outer end 228 of the lock pawl 216 is shaped to engage a locking mechanism 230 to block or inhibit rotation of the spool 214. The lock pawl 216 pivots from a position in which the lock pawl does not engage the locking mechanism 230 to a position in which the lock pawl engages the locking mechanism to block or inhibit rotation of the spool.

The locking mechanism 230 comprises a locking ring gear 232, a torsion bar 234, and a hydro-dynamic system or fluid pressure assembly 236. The locking ring gear 232 is annular in shape and is mounted on an outer surface of the side wall 220 for rotation relative to the frame 212. Inner teeth 238 are disposed in a circular array around the inner circumference of the locking ring gear 232. Outer teeth 240 are disposed in a circular array around the outer circumference of the locking ring gear 232.

The inner teeth 238 of the locking ring gear 232 are positioned to be engaged by the lock pawl 216 when the lock pawl pivots radially outward. The inner teeth 238 and the outer end 228 of the lock pawl 216 are shaped such that engagement between the inner teeth and the outer end of the lock pawl will block relative movement between the lock pawl and the locking ring gear 232 in one direction of rotation (e.g., clockwise rotation of the locking ring gear as viewed in FIG. 8). The inner teeth 238 and the outer end 228 of the lock pawl 216 are also shaped such that engagement between the inner teeth and the outer end of the lock pawl will permit relative movement between the lock pawl and the locking ring gear 232 in an opposite direction of rotation (e.g., counterclockwise rotation of the locking ring gear as viewed in FIG. 8).

The outer teeth 240 of the locking ring gear 232 are positioned to engage the torsion bar 234. More specifically, the torsion bar 234 extends from one side wall 218 to the other side wall 220 of the frame 212. The torsion bar 234 is disposed parallel to and spaced apart from the spool 214. The left end portion 242 of the torsion bar 234 is immovably attached or fixed to the left side wall 218 of the frame 212, as viewed in FIG. 10. As also seen in FIG. 10, the outer surface of the left end portion 242 is formed with splines 243. The splines 243 engage a complementarily shaped surface 245 defining an opening in the left side wall 218 to hold the left end portion 242 of the torsion bar 234 against rotation. The right end portion 244 of the torsion bar 234 is rotatably attached to or mounted on the right side wall 220 of the frame 212, as viewed in FIG. 10. The right end portion 244 of the torsion bar 234 also projects through the right side wall 220 of the frame 212. Gear teeth 246 are formed on the outer circumference of the right end portion 244 of the torsion bar 234. The gear teeth 246 are disposed outside the side wall 220 of the frame 212 and are positioned to be in constant meshing engagement with the outer teeth 240 of the locking ring gear 232.

As a result of the meshing engagement between the gear teeth 246 and the outer teeth 240 of the locking ring gear 232, rotational movement of the locking ring gear 232 relative to the frame 212 will effect corresponding rotational movement of the right end portion 244 of the torsion bar 234. For example, counter-clockwise movement of the locking ring gear 232, as viewed in FIG. 8, will effect clockwise movement of the right end portion 244 of the torsion bar 234. Because the left end portion 242 of the torsion bar 234 is immovably attached to or fixed to the frame 212, rotational movement of the right end portion 244 of the torsion bar relative to the frame 212 will effect twisting of the torsion bar and resistance to rotation of both the right end portion of the torsion bar and the locking ring gear 232.

The outer teeth 240 of the locking ring gear 232 are also positioned to engage the fluid pressure assembly 236. The fluid pressure assembly 236 comprises a piston-cylinder assembly 247, an adjustable fluid control valve 252, a conduit 254 connecting the piston-cylinder assembly to the fluid control valve, a fluid reservoir (not shown), and a drive mechanism 256 coupling the spool 214 to the fluid control valve. The piston-cylinder assembly 247 comprises a cylinder 248 and a piston 250 received in the cylinder. The cylinder 248 extends from one side wall 218 to the other side wall 220 of the frame 212. The cylinder 248 is disposed parallel to and spaced apart from the spool 214. The left end portion 258 of the cylinder 248 is rotatably attached to or mounted on the left side wall 218 of the frame 212, as viewed in FIGS. 8 and 10. The right end portion 260 of the cylinder 248 is rotatably attached to or mounted on the right side wall 220 of the frame 212, as viewed in FIGS. 8 and 10. The right end portion 260 of the cylinder 248 also projects through the right side wall 220 of the frame 212. Gear teeth 262 are formed on the outer circumference of the right end portion 260 of the cylinder 248. The gear teeth 262 are disposed outside the side wall 220 of the frame 212 and are positioned to be in constant meshing engagement with the outer teeth 240 of the locking ring gear 232.

As best seen in FIG. 10, the piston 250 includes a head portion 264, a shaft portion 266, and base portion 268. The head portion 264 of the piston 250 is the portion of the piston disposed closest to the right end portion 260 of the cylinder 248. The outer diameter of the head portion 264 is only slightly smaller than the inner diameter of the cylinder 248. To ensure a seal between the piston 250 and the cylinder 248, a piston ring 270 or similar device may be mounted in the outer circumference of the head portion 264 of the piston. The close fit between the outer circumference of the piston 250 and/or the piston ring 270 and the inner circumference of the cylinder 248 results in a fluid chamber 272 in the right end portion 260 of the cylinder. The fluid chamber 272 is sealed in the sense that fluid in the fluid chamber cannot pass by the outer circumference of the piston 250 and/or the piston ring 270. As explained below, however, fluid can pass out of the fluid chamber 272.

The shaft portion 266 of the piston 250 extends between and joins together the head portion 264 and the base portion 268. The base portion 268 of the piston 250 is disposed adjacent the left end portion 258 of the cylinder 248. A first part 274 of the base portion 268 of the piston 250, which is farthest to the left, as viewed in FIG. 10, has an outer circumferential surface formed with axially extending or longitudinally extending splines 276. The splines 276 engage a complementarily shaped surface 277 defining an opening in the left side wall 218 of the frame 212 to hold the base portion 268 of the piston 250 and the piston as a whole against rotation. A second part 278 of the base portion 268 of the piston 250, which is located to the right of the first part 274, as viewed in FIG. 10, has an outer circumferential surface formed with screw threads 280. The threads 280 engage mating threads 281 formed on the inner circumferential surface of the left end portion 258 of the cylinder 248.

To assemble the piston 250 and the cylinder 248, the head portion 264 of the piston is inserted into an open end of the left end portion 258 of the cylinder. When the threads 280 on the outer circumference of the base portion 268 of the piston 250 contact the mating threads 281 on the inner circumference of the left end portion 258 of the cylinder 248, the piston and cylinder are twisted relative to one another so that the piston is effectively screwed into the cylinder. In operation of the piston-cylinder assembly 247, because the gear teeth 262 on the cylinder 248 are in constant meshing engagement with the outer teeth 240 of the locking ring gear 232, rotation of the locking ring gear produces rotation of the cylinder relative to the frame 212. Because the piston 250 is held against rotation relative to the frame 212 through engagement of the splines 276 with the left side wall 218 of the frame, rotation of the cylinder 248 causes relative axial or longitudinal movement between the piston and the cylinder by reason of the contact or engagement between the threads 280 on the piston 250 and the threads 281 on the cylinder. When the lock pawl 216 engages one of the inner teeth 238 of the locking ring gear 232 and the locking ring gear rotates together with the spool 214, rotation of the spool and the locking ring gear thus produces relative axial or longitudinal movement of the piston 250 in the cylinder 248. In other words, the piston 250 and the cylinder 248 are operatively coupled to the rotatable spool 214 such that rotation of the spool causes the piston to move relative to the cylinder.

As shown in dashed lines in FIG. 8, a passage 282 extends or longitudinally through the head portion 264, the shaft portion 266, and the base portion 268 of the piston 250. In order to help tailor the performance of the fluid pressure assembly 236, the passage 282 receives a metering pin or valve pin 310. A first or right end portion 314 (as viewed in FIG. 10) of the valve pin 310 is connected to an inner surface of the right end portion 260 of the cylinder 248 so as to move with the cylinder. The axially opposite second or left end portion 316 (as viewed in FIG. 10) of the valve pin 310 is received in the passage 282. An outer circumferential surface 318 of the second end portion 316 of the valve pin 310 is tapered such that the largest outer diameter of the valve pin is farthest from the first end portion 314 and the smallest outer diameter of the valve pin is closest to the first end portion 314.

Because the piston 250 moves relative to the cylinder 248 during operation of the fluid pressure assembly 236, the valve pin 310 effectively moves within the passage 282. By appropriately configuring the outer surface of the valve pin 310, such as the outer surface 318 of the second end portion 316, and, potentially, the inner circumferential surface 312 of the piston 250 defining the passage 282, the flow of fluid through the passage 282 can be affected. In other words, the outer circumferential surface 318 of the valve pin 310 and the inner circumferential surface 312 of the piston 250 define between them a metering orifice or flow control orifice 319.

Although the outer circumferential surface 318 of the valve pin 310 is shown as being tapered and the inner circumferential surface 312 of the piston 250 is shown as being cylindrical, other shapes for the outer circumferential surface 318 and the inner circumferential surface 312 are possible and may be used to provide a desired fluid flow through the flow control orifice 319 and the passage 282. For example, the outer circumferential surface 318 of the valve pin 310 may be cylindrical and the inner circumferential surface 312 of the piston 250 may be tapered. As another example, the outer surface 318 of the valve pin 310 may be shaped to resemble an hourglass.

Fluid in the fluid chamber 272 can flow out of the fluid chamber into the passage 282 past the flow control orifice 319 defined between the outer surface 318 of the valve pin 310 and the inner surface 312 of the piston 250. Once in the passage 282, the fluid can flow along the passage 282 through the head portion 264, the shaft portion 266, and the base portion 268 of the piston 250. The end of the passage 282 at the left end (as viewed in FIG. 8) of the base portion 268 of the piston 250 is fluidly connected to or in fluid communication with a first end portion 284 of the conduit 254. Fluid from the fluid chamber 272 may, therefore, flow into the conduit 254.

The opposite second end portion 286 of the conduit 254 is fluidly connected to or in fluid communication with the fluid control valve 252. A check valve or burst disc (not shown) may be placed between the second end portion 286 of the conduit 254 and the fluid control valve 252 to help retain fluid in the fluid chamber 272 prior to actuation of the fluid pressure assembly 236. As best shown in FIG. 10, the fluid control valve 252 includes a valve housing 288 and a valve spool or valve body 290. The valve housing 288 includes a hollow tubular sleeve 289 and a cap or support member 302. The sleeve 289 is closed at one end or the right end 293, as viewed in FIG. 10, and is open at its opposite or left end, as viewed in FIG. 10. The support member 302 screws into the open end of the sleeve 289. An inner circumferential surface 294 of the sleeve 289 defines a valve passage 292 that is fluidly connected to or in fluid communication with the second end portion 286 of the conduit 254.

The valve body 290 is an elongated pin that ends through an opening in the support member 302. The valve body 290 has threads 305 formed on an outer circumferential surface 304 of the valve body. The threads 305 engage complementary threads on an inner circumferential surface 306 of the support member 302. A distal end portion 307 of the valve body 290 projects into the sleeve 289 beyond the support member 302 and into the valve passage 292. As a result of the threaded engagement or connection between the valve body 290 and the support member 302, rotational movement of the valve body 290 results in axial or longitudinal movement of the valve body relative to the support member 302, the sleeve 289, and the valve housing 288. Thus, distal end portion 307 of the valve body 290 moves axially or longitudinally in the valve passage 292 in the valve housing 288 to control the flow of fluid through the fluid control valve 252. The distal end portion 307 of the valve body 290 has an outer circumferential surface with a specially shaped contour, which in FIGS. 9 and 10 is a contour tapering to a point. The inner circumferential surface 294 of the sleeve 289 defining the valve passage 292 also has a specially shaped contour, which in FIGS. 9 and 10 is a cylindrical contour. Together, the outer circumferential surface of the valve body 290 and the inner circumferential surface 294 of the sleeve 289 of the valve housing 288 define a flow control orifice 296.

The valve body 290 is movable from a first position (not shown) in the valve passage 292 to a second position (also not shown) in the valve passage. In the first position of the valve body 290, the flow control orifice 296 is at or near its maximum cross-sectional flow area and the valve passage 292 is entirely or substantially open. In the second position of the valve body 290, the flow control orifice 296 has no cross-sectional flow area and the valve passage 292 is entirely closed or occluded by the valve body. As the valve body 290 moves from the first position to the second position, the cross-sectional flow area of the flow control orifice 296 varies in accordance with contours of the outer surface of the valve body and the inner circumferential surface 294 defining the valve passage 292. Although the flow control orifice 296 and the valve passage 292 may be incrementally closed off as the valve body 290 moves from the first position to the second position, the shapes of the contoured outer surface of the valve body and the inner circumferential surface 294 may provide the flow control orifice with a cross-sectional flow area that increases and decreases in various sequences and increments as valve body 290 moves from the first position to the second position and assumes different positions within the valve passage 292.

Fluid from the fluid chamber 272 may, therefore, flow through the conduit 254 into the fluid control valve 252. Within the fluid control valve 252, the fluid may flow through the valve passage 292 past the valve body 290 and the flow control orifice 296. After passing through the fluid control valve 252, the fluid may flow into a reservoir (not shown). The extent to which the valve body 290 occludes or blocks the valve passage 292 in the fluid control valve 252, together with the pressure and/or flow rate of the fluid, will determine the extent to which the fluid may flow through the fluid control valve and the extent to which there will be resistance to such fluid flow through the fluid control valve. Together, the flow control orifice 296 of the flow control valve 252, the flow control orifice 319 of the piston-cylinder assembly 247, and the torsion bar 234 help to limit a load applied to a vehicle occupant by the seat belt webbing when a vehicle (not shown) in which the retractor 10 is mounted experiences a crash event or vehicle crash condition. The flow control orifice 296 of the flow control valve 252, the flow control orifice 319 of the piston-cylinder assembly 247, and the torsion bar 234 thus comprise a load limiting systen for the retractor 200.

The position of the fluid control valve 252 relative to other components of the retractor 200 is determined, in part, by the space available. As shown in FIGS. 9 and 10, the fluid control valve 252 is mounted between the side walls 218 and 220 of the frame 212 so that the fluid control valve extends from one side wall 218 to the other side wall 220 and is spaced apart from the base wall 222 and the spool 214. The right end 293 of the sleeve 289 of the valve housing 288 is mounted for limited pivotal movement on the inwardly facing surface of the side wall 220 of the frame 212. The left end portion 291 of the valve body 290 project from the left end of the valve housing 288 and extends through the side wall 218 to lie adjacent the outward facing surface of the side wall 218 adjacent the left end portion of the spool 214.

The fluid control valve 252 must be positioned such that the drive mechanism 256 can couple the fluid control valve to the spool 214.

As shown in FIGS. 9 and 10, the drive mechanism 256 comprises a splined or toothed extension 298 on the spool 214 and a toothed drive wheel 300 connected to the left end portion 291 of the valve body 290 of the fluid control valve 252 for rotation with the valve body. The toothed extension 298 is connected to the spool 214 such that the toothed extension and the spool rotate together. The toothed extension 298 also projects away from the outwardly facing surface of the side wall 218 of the frame 212. A gear wheel 299 is mounted on the toothed extension 298 of the spool 214 for rotation with the spool. The gear wheel 299 engages a movable idler gear assembly 311. The idler gear assembly 311 includes a relatively large diameter idler gear 313 and a relatively small diameter idler gear 315. The idler gears 313 and 315 are spaced apart and are both fixed to a gear shaft (not shown). The larger diameter idler gear 313 directly engages the gear wheel 299. The smaller diameter idler gear 315 directly engages the toothed drive wheel 300 connected to the valve body 290 of the fluid control valve 252. The movable idler gear assembly 311 is the only connection for transferring rotational movement from the spool 214 to the valve body 290.

The drive mechanism 256 transmits rotational movement of the spool 214 to the fluid control valve 252 and, more particularly, to the valve body 290 within the fluid control valve. The toothed drive wheel 300 is connected to one end of the valve body 290. Due to the threaded connection between the outer circumferential surface 304 of the valve body 290 and the inner circumferential surface 306 of the support member 302, rotational movement of the valve body 290 produces axial movement of the valve body within the support member 302 and the valve housing 288 and within the valve passage 292. Movement of the spool 214 thus effects movement of the valve body 290 within the valve passage 292 in the fluid control valve 252 to adjust the cross-sectional flow area of the flow control orifice 296. An O-ring or other seal member 309 seals the interface between the support member 302 and the left end portion 291 of the valve body 290 at a location adjacent the toothed drive wheel 300 and adjacent to the threaded circumferential surfaces 304 and 306.

To permit the movable idler gear assembly 311 to move out of engagement with either or both the gear wheel 299 mounted on the spool 214 and the toothed drive wheel 300 connected to the valve body 290, as will be explained below, the idler gear assembly 311 is mounted on or connected to a lever 342. The lever 342 is mounted for pivotal movement on the side wall 218 of the frame 212. More specifically, the larger diameter idler gear 313 is supported adjacent an outwardly facing surface of the side wall 220 of the frame 612. The smaller diameter idler gear 315 is supported adjacent an inwardly facing surface of the side wall 220 of the frame 212. The idler gear shaft 317 extends through a slot formed in the side wall 220. The lever 342 is normally biased by a spring 343, such as an over center spring, to hold the idler gear assembly 311 in meshing engagement with the gear wheel 299 mounted on the spool 214 and the toothed drive wheel 300 connected to the valve body 290. When subjected to a force, as explained below, the lever 342 is pushed to a position in which the over center biasing spring 343 biases the lever in an opposite direction so as to pull and hold the idler gear assembly 311 out of engagement with either or both the toothed drive wheel 300 and the gear wheel 299 mounted on the spool 214. As a result, the valve body 290 of the fluid control valve 252 will no longer move in response to movements of the spool 214 and the size or cross-sectional flow area of the flow control orifice 296 in the fluid control valve remains fixed thereafter during subsequent operation of the fluid control valve and the locking mechanism 230.

The seat belt retractor 200 also includes a pretensioner or pretensioner assembly 330. The pretensioner assembly 330 operates to remove slack from seat belt webbing (not shown) wound on the spool 214 and also to pull the seat belt webbing closely to and against a vehicle occupant (not shown). Although many different designs of seat belt pretensioner assemblies are available, the pretensioner assembly shown in FIG. 10 comprises a tube 332, an elongated flexible member or snake 334 received in the tube, a vaned turbine wheel 336, and a micro gas generator 338. The tube 332 is formed of a metal, such as steel, or another material capable of withstanding high gas pressures. The elongated flexible member or snake 334 is formed of a material that is flexible, resists being compressed, and can be dug into by the blades of the turbine wheel 336. One such material is nylon 6. The turbine wheel 336 is formed of a metal, such as steel, or another strong, relatively rigid material. The turbine wheel 336 is either formed in one piece with or fixed or immovably connected to the gear wheel 299 so that the turbine wheel rotates with the spool 214.

The micro gas generator 338 is mounted at an end of the tube 332 located farthest or distally from the spool 214. The elongated flexible member or snake 334 is received in the tube 332 adjacent the micro gas generator 338. The elongated flexible member or snake 334 is configured and dimensioned to fit closely within the tube 332 to help reduce the possibility of gas generated by the micro gas generator 338 passing along the tube between the inner surface of the tube and the snake. A supplemental plug or sealing element (not shown) may be positioned between the micro gas generator 338 and the elongated flexible member or snake 334 to help further prevent gas from passing along passing along the tube 332 between the inner surface of the tube and the snake. The end of the tube 332 opposite the micro gas generator 338 is positioned adjacent the turbine wheel 336. The turbine wheel 336 is mounted on the left end (as viewed in FIG. 10) of the spool 214 for rotation with the spool. The turbine wheel 336 and the adjacent end of the tube 332 are enclosed by a pretensioner housing 340. Between the micro gas generator 338 and the turbine wheel 336, the tube 332 may have any outer shape or configuration as may required, for example, to facilitate packaging the retractor 200 in a particular vehicle (not shown), provided that the elongated flexible member or snake can follow the shape or configuration to move through the tube from one end to the other.

The pretensioner assembly 330 operates in response to a signal sent to the micro gas generator 338 either by or in response to a sensor (not shown) that is used to detect a vehicle crash condition or event. The signal causes the micro gas generator 338 to ignite and to produce or generate gas under pressure. The gas from the micro gas generator 338 pushes on the adjacent end of the elongated flexible member or snake 334, either directly or through a supplemental plug or sealing element (not shown). In response to the gas pressure, the elongated flexible member or snake 334 travels along the tube 332 and contacts one of the vanes of the turbine wheel 336, which vanes project into the tube to the extent of approximately one-half of the diameter of the tube and the snake. The elongated flexible member or snake 334 pushes the vane on the turbine wheel 336, which causes the turbine wheel to rotate. As the turbine wheel 336 rotates, the next vane on the turbine wheel contacts the elongated flexible member or snake 334, digs into the outer surface of the elongated flexible member or snake, and is pushed along by the elongated flexible member or snake, which causes further rotation of the turbine wheel. Rotation of the turbine wheel 336 causes the spool 214 to rotate in a direction that winds up the seat belt webbing (not shown) on the spool. The winding rotation of the spool 214 effectively reduces or eliminates slack in the seat belt webbing wound on the spool and also pulls the seat belt webbing closely and tightly against a vehicle occupant (not shown).

As the elongated flexible member or snake 334 moves past the turbine wheel 336, the snake is no longer constrained by the tube 332 but is nonetheless contained by the pretensioner housing 340. Although the portion of the elongated flexible member or snake 334 that has moved past the turbine wheel 336 is no longer actively contributing to the operation of the pretensioner assembly 330, the portion of the elongated flexible member or snake does interact with the fluid control valve 252. In particular, the pretensioner housing 340 directs the portion of the elongated flexible member or snake 334 that has moved past the turbine wheel 336 into contact with a lever 342. The lever 342 is normally biased by a spring (not shown), such as an over center spring, to hold the toothed drive wheel 300, which is connected to one end of the valve body 290, in meshing engagement with the toothed extension 298 on the spool 214.

When subjected to the force or pressure of the elongated flexible member or snake 334, the lever 342 is pushed to a position in which the over center biasing spring (not shown) biases the lever in an opposite direction so as to hold the movable idler gear assembly 311 out of engagement with either or both the gear wheel 299 mounted on the spool 214 and the toothed drive wheel 300 connected to the valve body 290. As a result, the valve body 290 of the fluid control valve 252 no longer moves in response to movements of the spool 214 and the size or cross-sectional flow area of the flow control orifice 296 in the fluid control valve remains fixed thereafter during subsequent operation of the fluid control valve and the locking mechanism 230. In other words, the flow control orifice 296 has a cross-sectional flow area that is adjustable in response to unwinding of seat belt webbing (not shown) from the rotatable spool 214 and rewinding of seat belt webbing onto the spool prior to a crash event involving a vehicle (not shown) in which the seat belt retractor 200 is mounted. The cross-sectional flow area of the flow control orifice 296, however, ceases to be adjustable in response to unwinding of seat belt webbing (not shown) from the rotatable spool 214 or rewinding of seat belt webbing onto the spool after the vehicle crash event is in progress. The pretensioner 296 thus is deployable so as to cause the flow control orifice 296 to cease to be adjustable in response to unwinding of seat belt webbing from the rotatable spool 214 after the crash event is in progress.

In use, when a vehicle occupant (not shown) grasps an available portion of the seat belt webbing (not shown) that is wound on the spool 214 of the retractor 200 and pulls webbing from the retractor in order to don the seat belt, the webbing unwinds from the spool and rotates the spool. Because the drive mechanism 256 is directly connected to the spool 214, rotation of the spool and thus the toothed extension 298 effects movement of the toothed drive wheel 300. Rotation of the toothed drive wheel 300 effects movement of the valve body 290 within the fluid control valve 252. The initial unwinding of the seat belt webbing (not shown) from the spool 214 when the occupant dons the seat belt thus establishes the starting position of the valve body 290 within the valve passage 292 in the fluid control valve 252 and the initial cross-sectional flow area of the flow control orifice 296. The initial extension or unwinding the seat belt webbing (not shown) will vary in accordance with the size (e.g., stature, girth, weight) of the occupant.

After the seat belt has been donned by the vehicle occupant (not shown), subsequent low speed extension and retraction movements of the seat belt webbing in a non-crash condition of the vehicle will produce rotational movements of the spool 214 and consequent adjustments of the position of the valve body 290 within the valve passage 292 in the fluid control valve 252. In a crash condition of the vehicle, at or upon the beginning of or the initiation of the vehicle crash event or crash condition, a vehicle inertia sensor (not shown), such as a known ball sensor, such as shown, for example, in U.S. Pat. No. 5,495,994, or a webbing sensor (not shown) will detect either a rapid deceleration of the vehicle or a rapid acceleration of the seat belt webbing as the occupant's body moves forward and extends or unwinds the seat belt webbing, respectively. The vehicle inertia sensor or the webbing sensor will cause the lock pawl 216 of the retractor 200 to pivot radially outward and engage the inner teeth 238 of the locking ring gear 232.

At the same time as, or shortly before, the lock pawl 216 moves to engage the inner teeth 238 of the locking ring gear 232, the pretensioner assembly 330 is deployed via ignition of the micro gas generator 338. Deployment or operation of the pretensioner assembly 330 also disengages the movable idler gear assembly 311 from either or both the gear wheel 299 mounted on the spool 214 and/or the toothed drive wheel 300 connected to the valve body 290. As a result, the valve body 290 of the fluid control valve 252 no longer moves in response to movements of the spool 214 and the size or cross-sectional flow area of the flow control orifice 296 remains fixed thereafter during operation of the retractor.

When the radially outer end 228 of the lock pawl 216 engages one of the inner teeth 238 of the locking ring gear 232, the locking ring gear will rotate together with the spool 214. As the locking ring gear 232 rotates, the meshing engagement between the outer teeth 240 of the locking ring gear and the gear teeth 246 on the right end portion 244 of the torsion bar 234 causes the torsion bar to twist and to resist rotation of the locking ring gear and the spool 214.

In addition, as the locking ring gear 232 rotates, the meshing engagement between the outer teeth 240 of the locking ring gear and the gear teeth 262 on the right end portion 260 of the cylinder 248 causes the cylinder to rotate. Rotation of the cylinder 248 causes the piston 250 to move to the right, as viewed in FIG. 10, due to the engagement between the threads 280 on the base portion 268 of the piston 250 and the mating threads (not shown) formed on the inner circumference of the left end portion 258 of the cylinder. Movement of the piston 250 to the right in the cylinder 248 causes reduction in the volume of the fluid chamber 272. As the volume of the fluid chamber 272 is reduced, the fluid in the fluid chamber is forced out of the fluid chamber into the passage 282, past the flow control orifice 319 defined between the outer surface 318 of the valve pin 310 and the inner surface 312 of the piston 250. Once in the passage 282, the fluid flows along the passage 282 through the head portion 264, the shaft portion 266, and the base portion 268 of the piston 250. The fluid forced from the fluid chamber 272 flows through the conduit 254 into the fluid control valve 252.

Within the fluid control valve 252, the fluid encounters the valve body 290 in the valve passage 292. Depending on the extent to which the valve body 290 occludes or blocks the valve passage 292 and, potentially, the external shape of the valve body, both of which will help to determine or establish the cross-sectional flow area of the flow control orifice 296 in the fluid control valve 252, and depending on the velocity or speed with which the fluid is being forced to flow through the flow control orifice, the fluid control valve will provide greater or lesser back-pressure to resist the flow of fluid through the flow control orifice. The extent of the resistance to fluid flow provided by the fluid control valve 252 will help determine the extent to which there is resistance to movement of the piston 250 within the cylinder 248 and the extent to which there is resistance to rotation of the cylinder and rotation of the locking ring gear 232. In this regard, it should be recognized that an increase in fluid velocity through the flow control orifice 296 will produce a geometric (e.g., quadratic), rather than linear, increase in resistance to movement of the piston 250, the cylinder 248, and the locking ring gear 232.

The resistance to rotation or the reaction load or force provided by the fluid pressure assembly 236 is additive to the resistance to rotation or loads provided by the torsion bar 234. The torsion bar 234, in effect, provides a constant baseline or minimum level of resistance or load, while the fluid pressure assembly 236 provides higher resistances or loads. In other words, the torsion bar 234 is twisted and provides load limiting resistance to rotation of the spool 214 when the seat belt webbing (not shown) applies a load to the spool in excess of a first predetermined load. The fluid pressure assembly 236, including the fluid control valve 252, provides load limiting resistance to rotation of the spool 214 when the seat belt webbing (not shown) applies a load to the spool in excess of a second predetermined load. In the retractor 200 as shown, the second predetermined load is the same as the first predetermined load because the locking ring gear 232 is engaged with both the torsion bar 234 and the fluid pressure assembly 236 and applies a rotational force or load to both the torsion bar and the fluid pressure assembly at the same time and to the same extent. The second predetermined load may, however, be greater than the first predetermined load if, for example, a check valve is placed downstream of the metering orifice or flow control orifice 319 and the check valve has an activation pressure that requires a rotational force or load applied to the spool 214 in excess of the load required to begin twisting the torsion bar.

In addition, because the position of the valve body 290 within the fluid control valve 252 immediately prior to the vehicle crash condition is determined by the webbing payout or extent to which the webbing is unwound from the spool 214, the valve body is positioned in accordance with the size (e.g., stature, girth, weight) of the occupant and/or in accordance with the extent to which the occupant is not correctly positioned in the vehicle seat (not shown). Thus, for example, if the vehicle occupant has leaned forward just prior to the vehicle crash condition and thereby unwound more seat belt webbing from the spool 214, the valve body 290 will be positioned within the fluid control valve 252 as though the occupant were larger in size. The effective result of such positioning of the valve body 290 is that the resistance to further forward movement of the vehicle occupant and further unwinding of seat belt webbing from the spool 214 will be greater than it would be if the occupant were properly positioned in the vehicle seat. Such greater resistance is appropriate because the vehicle occupant will have a smaller distance to move forward during the vehicle crash event before striking a forward portion of the vehicle, such as the vehicle instrument panel. The operation of the fluid control valve 252 thus accommodates or is responsive to both the size of the occupant and whether the occupant is out of position at the time of the vehicle crash condition.

Figure 11:
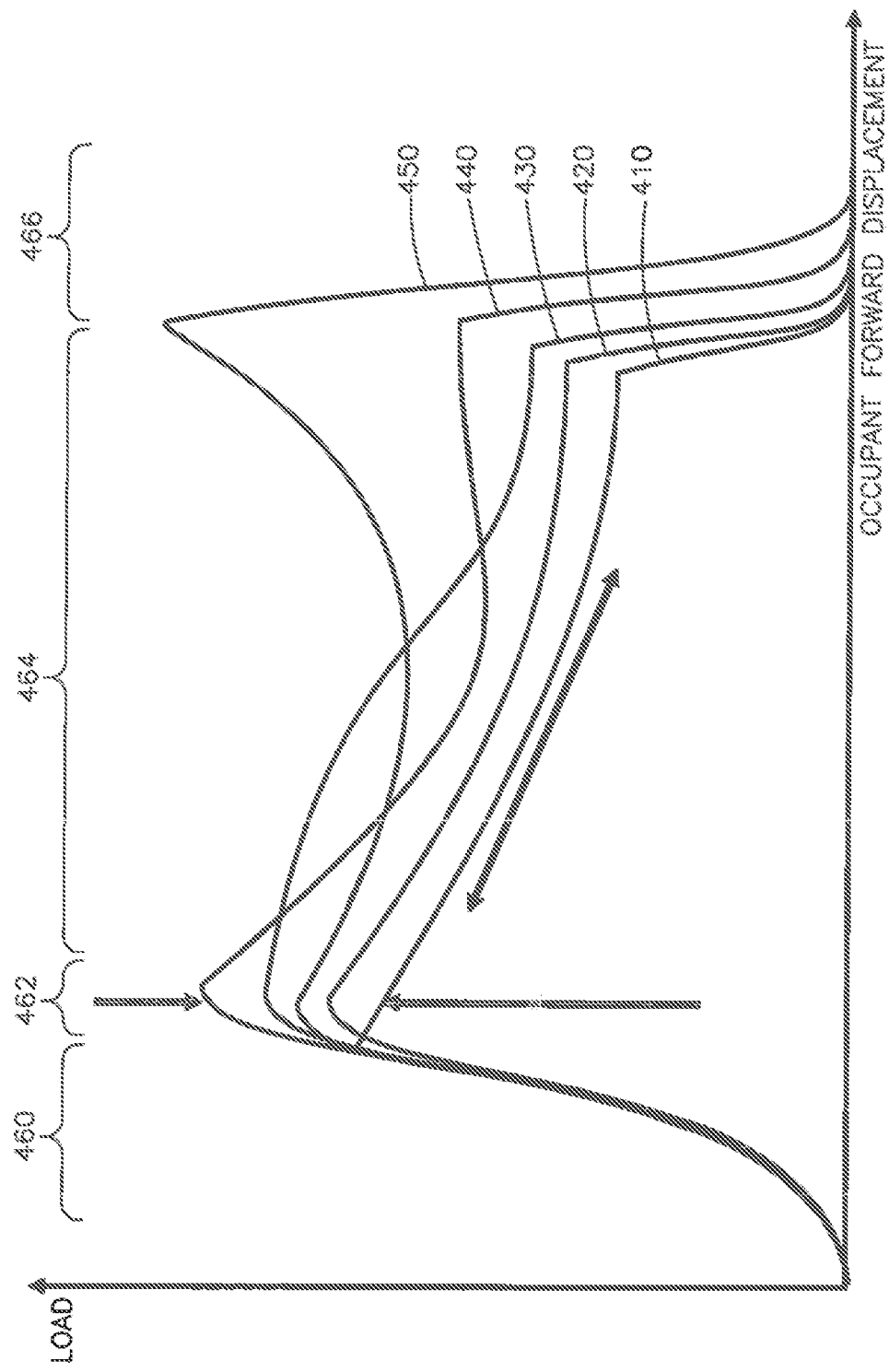
FIG. 11 displays a series of curves showing theoretical relationships between the load on seat belt webbing during a vehicle crash event and the forward displacement of a vehicle occupant who is held by the seat belt webbing and the retractor of FIG. 8.

To illustrate and further explain the effects and interactions of various subassemblies and components of the retractor 200 during a vehicle crash event, FIG. 11 displays a series of curves 410, 420, 430, 440 and 450 that show theoretical relationships between the load on seat belt webbing during a vehicle crash event and the forward displacement of a vehicle occupant who is held by the seat belt webbing, which is wound on the retractor 200. During the initial stage 460 of the vehicle crash event, the spool 214 of the retractor 200 is locking so that the load on the seat belt webbing is increasing even as the occupant continues to move forward. At the same time, the fluid control valve 252 is being disengaged or decoupled from the spool 214. As can be seen, the five curves 410-450 remain essentially the same and overlie one another during the initial stage 460 of the vehicle crash event.

During a second stage 462 of the vehicle crash event, the locking ring gear 232 is beginning to rotate, as is the right end portion 244 of the torsion bar, and the piston 250 is moving axially within the cylinder 248 to push fluid out of the fluid chamber 272 and into the fluid control valve 252. As can be seen, the five curves 410-450 begin to diverge during the second stage of the vehicle crash event. The load on the webbing represented by the curve 410 indicates a relatively small vehicle occupant and a reduced resistance being applied to the vehicle occupant. Due to the small size of the vehicle occupant, the valve body 290 of the fluid control valve 252 has been positioned via the payout of the seat belt webbing just prior to the crash event so as to provide a relatively smaller resistance to fluid flow and further webbing payout. In contrast, the load on the webbing represented by the curve 440 indicates a relatively large vehicle occupant and an increased resistance being applied to the vehicle occupant. Due to the relatively large size of the vehicle occupant, the valve body 290 of the fluid control valve 252 has been positioned via the payout of the seat belt webbing just prior to the crash event so as to provide a relatively larger or greater resistance to fluid flow and further webbing payout. This difference in loads on the seat belt webbing and resistance to further webbing payout is achieved through the positioning of the valve body 290 of the fluid control valve 252, which reflects the flexibility provided by the retractor 200 to adjust its performance in accordance with characteristics, such as size, of the vehicle occupant.

During a third stage 464 of the vehicle crash event, the locking ring gear 232 continues to rotate, as does the right end portion 244 of the torsion bar, and the piston 250 continues to move axially within the cylinder 248 to push fluid out of the fluid chamber 272 and into the fluid control valve 252. As can be seen, the three of the five curves, namely curves 410, 420, and 430, generally exhibit a declining load limiting effect during the third stage 464 of the vehicle crash event. The loads on the seat belt webbing represented by the curves 410, 420, and 430 generally decline during the third stage 464 of the vehicle crash event, which reflects a reduced resistance to further movement of the vehicle occupant, although the actual loads continue to differ from one curve 410-430 to another due to the difference in the initial peak load established during second stage of the vehicle crash event by the position of the valve body 290 of the fluid control valve 252. The slope and shape of the curves 410, 420, and 430 is determined by the shapes of the outer surface 318 of the valve pin 310 and the inner surface 312 of the piston 250, which define between them the flow control orifice 319. The curve 440 is generally shaped like the curves 410, 420, and 430, but has an upwardly curved configuration toward the end of the third stage 464. The slope and shape of the curve 440 is determined by the shapes of the outer surface 318 of the valve pin 310 and the inner surface 312 of the piston 250, which define between them the flow control orifice 319. The curve 450 initially slopes downward, like the curves 410-440, but then sharply rises. The initial slope and shape of the curve 450 is determined by the shapes of the outer surface 318 of the valve pin 310 and the inner surface 312 of the piston 250, which define between them the flow control orifice 319. The slope and shape of the curve 450 in the later portion of the third stage 464 of the crash event, however, is determined by the piston 250 nearing the end of its travel relative to the cylinder 248.

In the fourth and final stage 466 of the vehicle crash event, the vehicle crash event is ending, the loads on the seat belt webbing are returning to zero or nominal loads, and forward displacement of the vehicle occupant is ending.

All of the foregoing differences in operation or function of the retractor 200 are achieved by the mechanical and hydraulic components and subassemblies without electronic controls or other components, except potentially the sensor for the micro gas generator 338. The absence of electronic controls and other components provides a relatively low level of complexity and difficulty in integrating the retractor 200 into a vehicle, as compared to a retractor with electronic controls and other electronic components.

Figure 12:
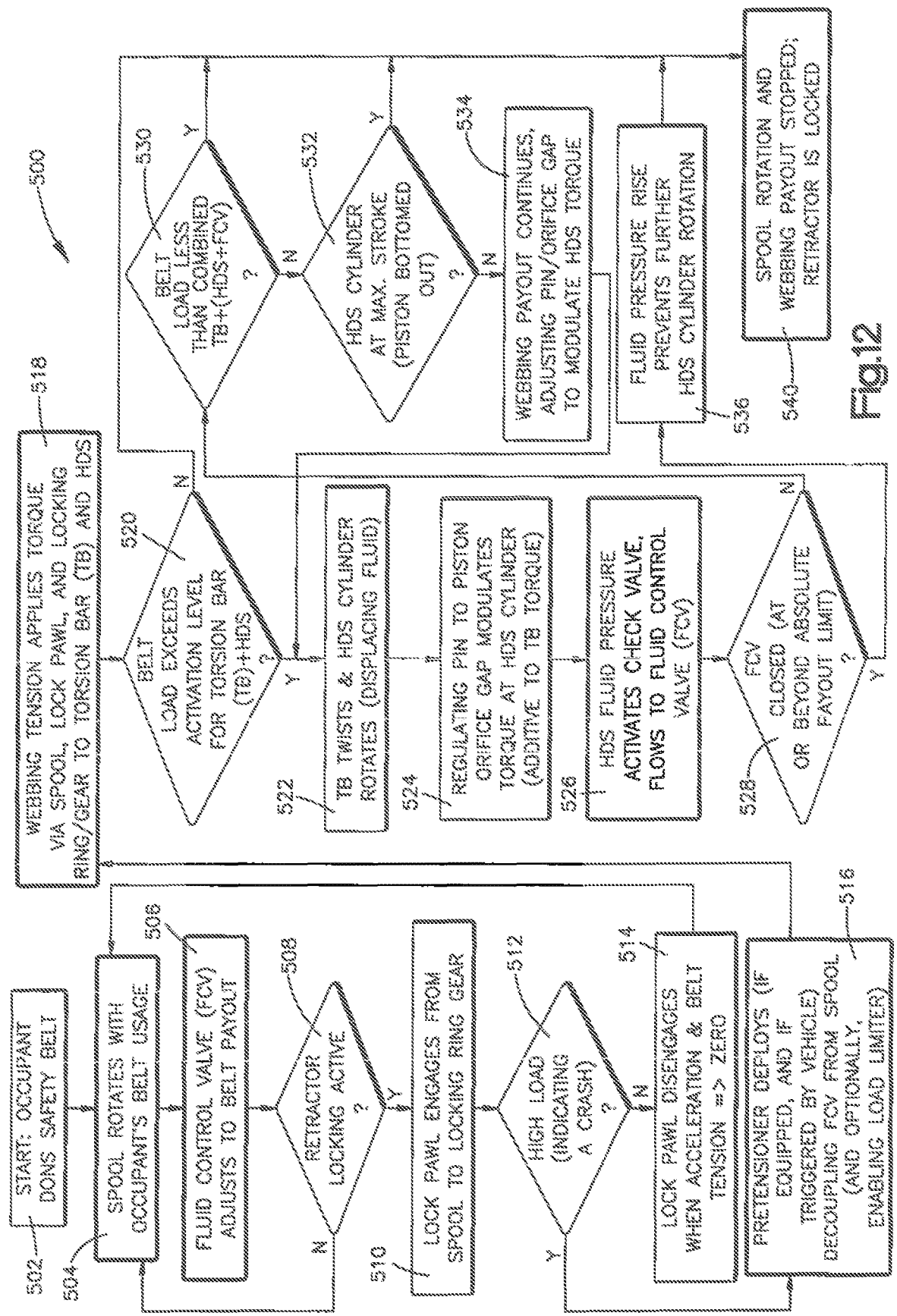
FIG. 12 is a flow chart illustrating a second method of operating a seat belt retractor, such as the seat belt retractor shown in FIG. 8, in accordance with the present invention.

FIG. 12 is a flow chart detailing a method 500 of operation of a retractor such as the retractor 200 shown in FIGS. 8 through 10. The method 500 starts at block 502 in which a vehicle occupant dons the safety belt or seat belt. The method 500 proceeds to step 504 in which the spool, such as spool 214, rotates in response to the vehicle occupant's extension of the seat belt when donning the seat belt. In step 506, a fluid control valve, such as fluid control valve 252, responds to the initial extension of the seat belt so as to establish the initial position of a valve body, such as valve body 290, within the fluid control valve. In step 508, if a locking mechanism, such as lock pawl 216, for the retractor is not active, the method 500 returns to step 504, in which the spool moves in response to movement of the seat belt webbing. If a locking mechanism, such as lock pawl 216, for the retractor is active, the method 500 proceeds from step 508 to step 510, in which the locking mechanism for the retractor moves to an active position, such as the lock pawl 216 engaging the locking ring gear 232.

From step 510, a determination is made in step 512 as to whether there is a load on the spool and the locking mechanism of sufficient magnitude that a vehicle crash condition is indicated. If no vehicle crash condition is determined in step 512, the method 500 moves on to step 514, in which the locking mechanism moves from an active or engaged position to an inactive or disengaged position. With regard to step 512, "a determination is made" in the sense that the retractor responds to vehicle deceleration and/or belt tension or loads. In addition, the locking mechanism moves to an inactive or disengaged position only after the vehicle deceleration and belt tension have dropped below predetermined threshold values. From step 514, the method 500 returns to step 504, in which the spool moves in response to movement of the seat belt webbing.

If the determination in step 512 is that the load on the spool and the locking mechanism of sufficient magnitude to indicate a vehicle crash condition, the method 500 moves on to step 516. In step 516, a pretensioner, such as pretensioner assembly 330, is deployed. The method 500 then proceeds to step 518. At step 138, webbing tension applies torque through the spool, such as spool 214, the lock pawl, such as lock pawl 216, and a locking ring gear, such as locking ring gear 232, to a torsion bar, such as torsion bar 234, and a cylinder, such as cylinder 248, of a hydro-dynamic load limiting system, such as fluid pressure assembly 236. From step 518, the method 500 moves on to step 520, in which a determination is made as to whether there is a load on the seat belt, the spool, and the locking mechanism of sufficient magnitude that load-limiting via a torsion bar, such as torsion bar 234, and a hydro-dynamic load limiting system, such as fluid pressure assembly 236, is indicated. With regard to step 520, "a determination is made" in the sense that the retractor responds to belt tension or loads. If no load limiting is determined in step 520, the method 500 moves on to step 540, in which the spool rotation and webbing payout is stopped, and the retractor is locked. As implemented in the retractor 200, if the load applied to the locking ring gear 232 by the seat belt webbing acting through the spool 214 is not sufficient to overcome the inherent resistance to twisting of the torsion bar 234, the locking ring gear does not rotate and the engagement between the lock pawl 216 and the locking ring gear stops rotation of the spool and payout or extension of the seat belt webbing.

If the determination in step 520 is that load limiting is indicated, the method 500 moves on to step 522. At step 522, the torsion bar, such as torsion bar 234, twists and the hydro-dynamic system, such as fluid pressure assembly 236, begins to displace fluid. As implemented in the retractor 200, if the load applied to the locking ring gear 232 by the seat belt webbing acting through the spool 214 is sufficient to overcome the inherent resistance to twisting of the torsion bar 234, the locking ring gear rotates. Rotation of the locking ring gear 232 causes rotation of both (a) the right end portion 244 of the torsion bar 234, which initiates twisting of the torsion bar, and (b) the right end portion 260 of the cylinder 248, which initiates movement of the piston 250 toward right in the cylinder and consequent reduction of the volume of the fluid chamber 272 and increase in pressure to effect a flow of fluid out of the fluid chamber. From step 522, the method 500 moves on to step 524, in which the fluid flowing out of the fluid chamber 272 flows past into the passage 282 past a flow control orifice, such as the flow control orifice 319 defined between a regulating valve pin, such as the valve pin 310, and a piston, such as the piston 250, which modulates the torque applied to the cylinder, such as cylinder 248. The method 500 then progresses from step 524 to step 526, in which the fluid flowing out of the chamber, such as fluid chamber 272, flows into a conduit, such as the conduit 254, opens a one-way check valve or a burst disc (if used), and flows into a fluid control valve, such as the fluid control valve 252.

From step 526, the method 500 proceeds to step 528. In step 528, a determination is made as to whether or not the fluid control valve is closed. With regard step 528, "a determination is made" in the sense that the fluid control valve either has or does not have additional travel before the flow control orifice is closed. If there is no additional travel and the flow control orifice is fully occluded or closed, and the fluid control valve is thus closed, the method 500 proceeds to step 536. In step 536, the closed fluid control valve stops fluid flow out of the fluid chamber in the cylinder. The pressure in the fluid chamber rises and further movement of the piston is blocked. As movement of the piston is blocked, rotation of the cylinder is also blocked. Because the cylinder cannot rotate, rotation of the locking ring gear is blocked. From step 536, the method 500 proceeds to step 540, in which the spool rotation and webbing payout is stopped, and the retractor is locked.

In step 528, if a determination is made that the fluid control valve, such as the fluid control valve 252, is not closed and the flow control orifice is also not closed, the method 500 proceeds to step 530. In step 530, a determination is made as to whether the load on the seat belt webbing is less than the load limit level that can be provided by the torsion bar and the hydro-dynamic system. In other words, the torsion bar and the hydro-dynamic system are intended to limit the load on the seat belt webbing by allowing the webbing to continue to pay out while offering resistance to the webbing payout. Once the load on the seat belt webbing is less than the load necessary to actuate the torsion bar and the hydro-dynamic system, the load has, in effect, been limited and further operation of the torsion bar and the hydro-dynamic system is not required. Thus, in step 530, if a determination is made that the load on the seat belt webbing is less than the load limit level that can be provided by the torsion bar and the hydro-dynamic system, the method 500 proceeds to step 540, in which the spool rotation and webbing payout is stopped, and the retractor is locked.

If, on the other hand, a determination is made in step 530 that the load on the seat belt webbing is greater than the load limit level that can be provided by the torsion bar and the hydro-dynamic system, the method 500 proceeds to step 532. In step 532, a determination is made as to whether the valve body of the fluid pressure assembly, such as the valve pin 310 of the fluid pressure assembly 236, has reached the end of its possible range of movement. If the valve body has reached the end of its possible range of travel, the method 500 proceeds to step 540, in which the spool rotation and webbing payout is stopped, and the retractor is locked. If the valve body has not reached the end of its possible range of travel, the method 500 proceeds to step 534, in which the fluid control valve continues to modulate the fluid flow out of the fluid chamber in the cylinder and, consequently, the pressure in the fluid chamber resisting movement of the piston and rotation of the cylinder. From step 534, the method 500 returns to step 522.

Figure 13:
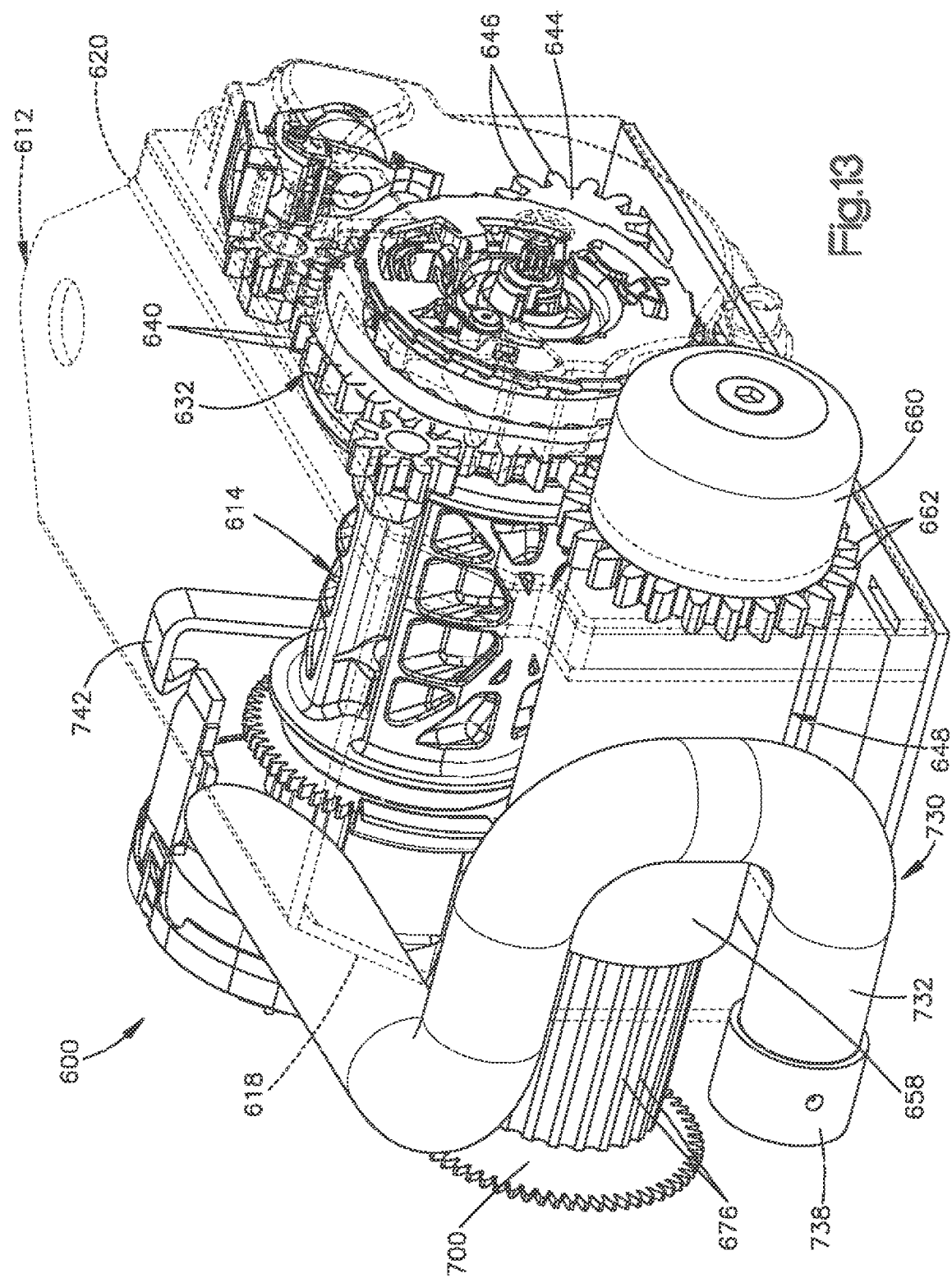
FIG. 13 is a perspective view, in which certain parts are omitted, of a seat belt retractor in accordance with a fourth embodiment of the present invention.
Figure 14:
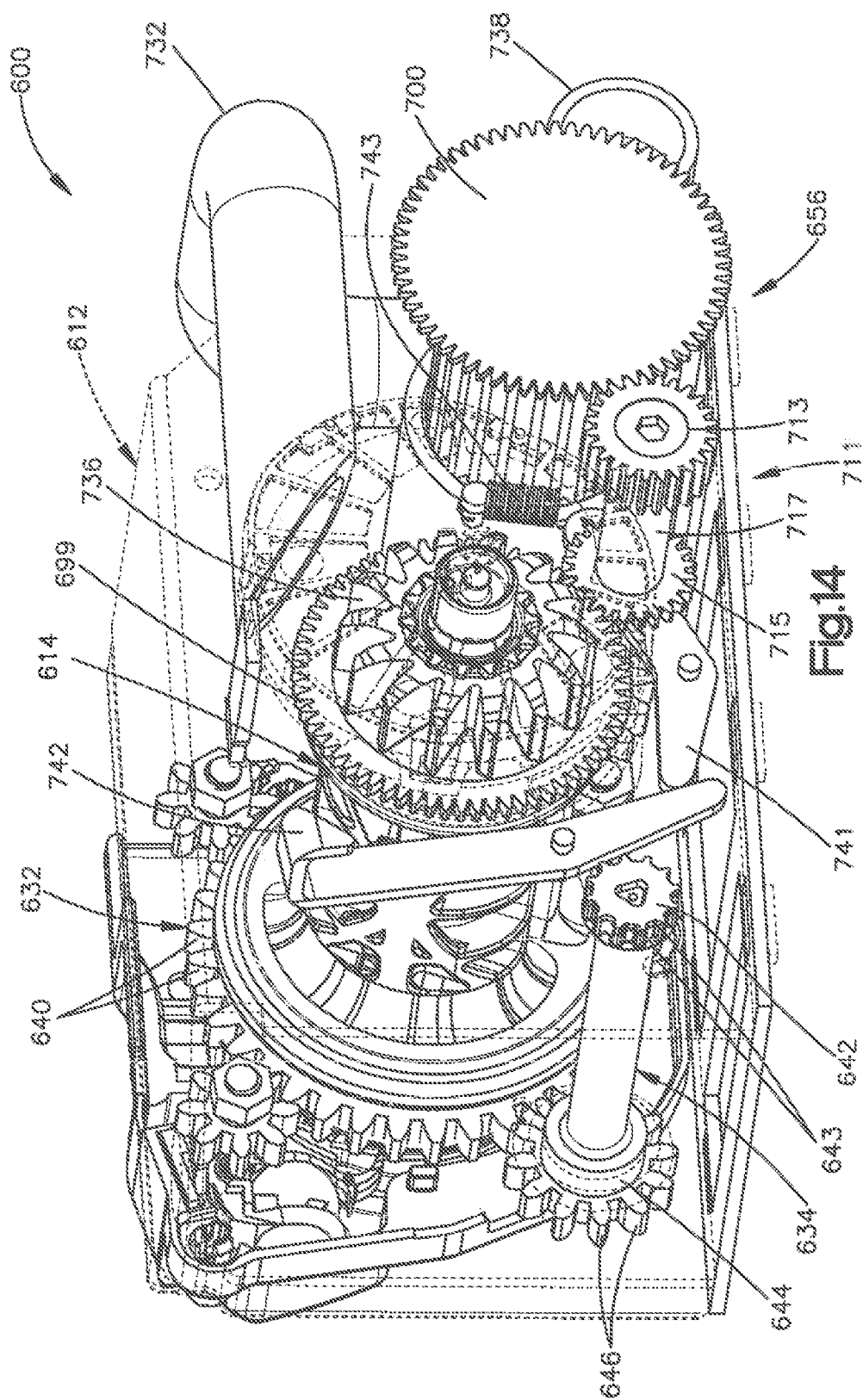
FIG. 14 is another perspective view, in which certain parts are omitted, of the seat belt retractor of FIG. 13.
Figure 15:
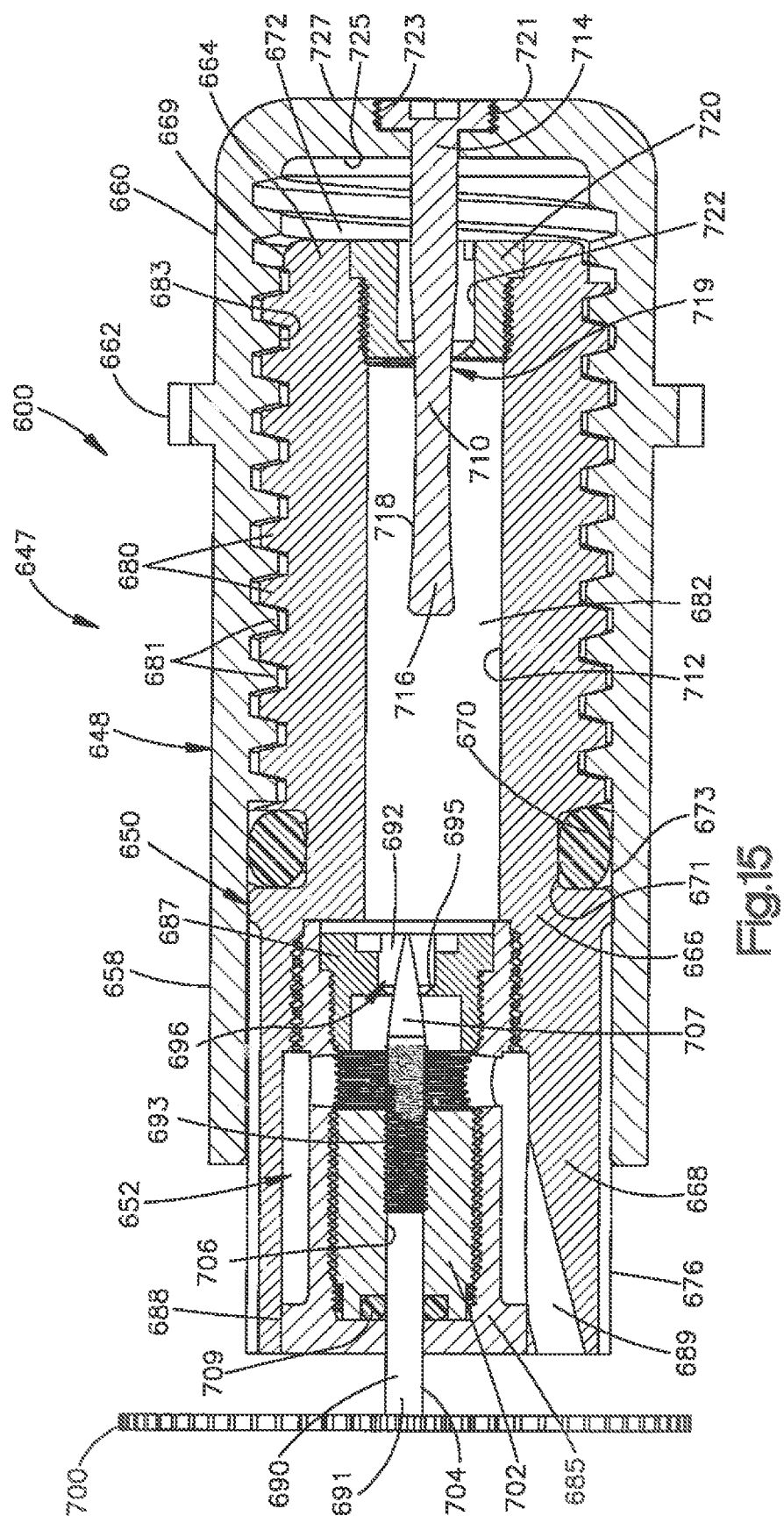
FIG. 15 is a sectional view of an assembly incorporated in the seat belt retractor of FIG. 13.

FIGS. 13 to 15 illustrate a seat belt retractor 600, in accordance with a fourth example of the present invention. The seat belt retractor 600 is similar to the seat belt retractor 200 in many respects. In the example embodiment of FIGS. 13 to 15, components of the seat belt retractor 600 that correspond to components of the seat belt retractor 200 are identified with the same reference numerals increased by 400.

A difference between the seat belt retractors 200 and 600 is that the fluid pressure assembly 236 of the retractor 200 comprises a piston-cylinder assembly 247, an adjustable fluid control valve 252 that is spaced apart from the piston-cylinder assembly, and an external conduit 254 connecting the piston-cylinder assembly to the fluid control valve. In the retractor 600, on the hand, there is no external conduit connecting a piston-cylinder assembly to a fluid control valve that is spaced apart from the piston-cylinder assembly. Instead, the adjustable fluid control valve 652 is incorporated into the piston-cylinder assembly 647, as is best shown in FIG. 15.

More specifically, like the piston-cylinder assembly 247 of the retractor 200, the piston-cylinder assembly 647 of the retractor 600 comprises a cylinder 648 and a piston 650 received in the cylinder. The cylinder 648 extends from one side wall 618 to the other side wall 620 of the frame 612. The cylinder 648 is disposed parallel to and spaced apart from the rotatable spool 614. The left end portion 658 of the cylinder 648 is rotatably attached to or mounted on the left side wall 618 of the frame 612, as viewed in FIG. 12. The right end portion 660 of the cylinder 648 is rotatably attached to or mounted on the right side wall 620 of the frame 612, as viewed in FIG. 12. The right end portion 660 of the cylinder 648 also projects through the right side wall 620 of the frame 612. Gear teeth 662 are formed on the outer circumference of the right end portion 660 of the cylinder 648. The gear teeth 662 are disposed outside the side wall 620 of the frame 612 and are positioned to be in constant meshing engagement with the outer teeth 640 of the locking ring gear 632.

As best seen in FIG. 15, the piston 650 includes a head portion 664, an intermediate portion 666, and base portion 668. The intermediate portion 666 of the piston 650 extends between and joins together the head portion 664 and the base portion 668. The head portion 664 of the piston 650 is the portion of the piston disposed closest to the right end portion 660 of the cylinder 648. The outer circumferential surface 669 of the head portion 664 is formed with screw threads 680. The threads 680 engage mating threads 681 formed on the inner circumferential surface 683 of the right end portion 660 of the cylinder 648. To assemble the piston 650 and the cylinder 648, the head portion 664 of the piston is inserted into an open end 659 of the left end portion 658 of the cylinder. When the threads 680 on the outer circumferential surface 669 of the head portion 664 of the piston 650 contact the mating threads 681 on the inner circumferential surface 683 of the right end portion 660 of the cylinder 648, the piston and cylinder are twisted relative to one another so that the piston is effectively screwed into the cylinder.

The outer diameter of the intermediate portion 666 of the piston 650 is only slightly smaller than the adjacent inner diameter of left end portion 658 of the cylinder 648. To ensure a seal between the piston 650 and the cylinder 648, an O-ring 670 or similar sealing device is mounted in the outer circumferential surface 671 of the intermediate portion 666 of the piston. The close fit between the outer circumferential surface 671 of the intermediate portion 666 of the piston 650 and/or O-ring 670 and the inner circumferential surface 673 of the cylinder 648 results in a fluid chamber 672 in the right end portion 660 of the cylinder. The fluid chamber 672 is sealed in the sense that fluid in the fluid chamber cannot pass by the outer circumference of the piston 650 and/or the O-ring 670. As explained below, however, fluid can pass out of the fluid chamber 672.

The base portion 668 of the piston 650 is disposed adjacent the left end portion 658 of the cylinder 648. The base portion 668 of the piston 650 is formed with axially extending or longitudinally extending splines 676. The splines 676 engage a complementarily shaped surface (not shown) defining an opening (not shown) in the left side wall 618 of the frame 612 to hold the base portion 668 of the piston 650 and the piston as a whole against rotation.

As shown in FIG. 15, a passage 682 extends axially through the head portion 664 and the intermediate portion 666 of the piston 650 and into the base portion 668 of the piston 650. In order to help tailor the performance of the fluid pressure assembly 636, the passage 682 receives a metering pin or valve pin 710. A first portion 714 of the valve pin 710 is connected via screw threads 721 to a threaded surface 723 that extends through the right end portion 660 of the cylinder 648 from an interior surface 725 of right end portion to an exterior surface 725 of the right end portion. The axially opposite second end portion 716 of the valve pin 710 is received in the passage 682. An outer circumferential surface 718 of the second end portion 716 of the valve pin 710 is shaped to resemble an hourglass with a largest outer diameter of the valve pin being both farthest from and closest to the first end portion 714 and the smallest outer diameter of the valve pin is intermediate the two portions of the surface having the largest diameters.

Because the piston 650 moves relative to the cylinder 648 during operation of the fluid pressure assembly 636, the valve pin 710 effectively moves within the passage 682 as a result of the threaded connection between the right end portion 714 and the right end portion 660 of the cylinder 648. By appropriately configuring the outer surface of the valve pin 710, such as the outer circumferential surface 718 of the second end portion 716, and, potentially, the inner circumferential surface 712 of the piston 650 defining the passage 682, the flow of fluid through the passage 682 can be affected. In other words, the outer circumferential surface 718 of the valve pin 710 and the inner circumferential surface 712 of the piston 650 define between them a metering orifice or flow control orifice 719. In order to provide greater definition to the orifice and to provide the possibility of changing the orifice during assembly of the piston-cylinder assembly 647, a removable orifice member 720 may be screwed into the head end portion 664 of the piston 650 so that the orifice member is received in the right end of the passage 682. The orifice member 720 has an inner circumferential surface 722 that is tapered to define a circular contour, which is the smallest cross-sectional flow area throughout the passage 682. Movement of the outer circumferential surface 718 of the valve pin 710 past the inner circumferential surface 722 of the orifice member thus defines metering orifice or flow control orifice 719. Although the outer circumferential surface 718 of the valve pin 710 is shown as being shaped to resemble and hourglass, and the inner circumferential surface 722 of the orifice member 720 is shown as being tapered to provide a circular passage contour, other shapes for the outer circumferential surface 718 and the inner circumferential surface 712 are possible and may be used to provide a desired fluid flow through the flow control orifice 719 and the passage 682.

Fluid in the fluid chamber 672 can flow out of the fluid chamber into the passage 682 past the flow control orifice 719 defined between the outer circumferential surface 718 of the valve pin 710 and the inner circumferential surface 722 of the orifice member 720 in the piston 650. Once in the passage 682, the fluid can flow along the passage 682 through the head portion 664 and the intermediate portion 666 of the piston 650 and into the base portion 668 of the piston 650. The end of the passage 682 at the left end (as viewed in FIG. 15) of the intermediate portion 666 of the piston 650 is fluidly connected to or in fluid communication with the fluid control valve 652. Fluid from the fluid chamber 672 may, therefore, flow into the fluid control valve 652. A check valve or a burst disc (not shown) may be placed between the passage 682 and the fluid control valve 652, upstream of the fluid control valve, to help retain fluid in the fluid chamber 672 prior to actuation of the fluid pressure assembly 636.

As best shown in FIG. 15, the fluid control valve 652 is mounted in the base portion 668 of the piston 650 and includes a valve housing 688 and a valve spool or valve body 690. The valve housing 688 includes a hollow tubular sleeve 685 with an open end and a plug 687 that screws into the open end of the sleeve. An inner surface 695 of the plug 687 extends through the plug and defines a valve passage 692. The valve body 690 is an elongated pin that ends through an opening in an otherwise closed end of the sleeve 685 opposite the open end of the sleeve. The valve body 690 has threads 693 formed on an outer circumferential surface 704 of the valve body. The threads 693 engage complementary threads on an inner circumferential surface 706 of a support member 702 mounted inside the sleeve 685 adjacent the closed end of the sleeve. A distal end portion 707 of the valve body 690 projects into the sleeve 685 beyond the support member 702 and into the valve passage 692 in the plug 687. As a result of the threaded engagement or connection between the valve body 690 and the support member 702, rotational movement of the valve body 690 results in axial or longitudinal movement of the valve body relative to the support member 702, the sleeve 685, and the valve housing 688. Thus, distal end portion 707 of the valve body 690 moves axially or longitudinally in the valve passage 292 in the valve housing 688 to control the flow of fluid through the fluid control valve 652. The distal end portion 707 of the valve body 690 has an outer circumferential surface with a specially shaped contour, which in FIG. 15 is a contour tapering to a point. The surface 695 of the plug 687 of the valve housing 688 defining the smallest diameter outer circumference of the valve passage 692 also has a specially shaped contour, which in FIG. 15 is a taper to provide a circular contour. Together, the outer circumferential surface of the valve body 690 and the surface 694 of the plug 687 of the valve housing 688 define a flow control orifice 696.

The valve body 690 is movable from a first position (not shown) in the valve passage 692 to a second position (also not shown) in the valve passage. In the first position of the valve body 690, the flow control orifice 696 is at or near its maximum cross-sectional flow area and the valve passage 692 is entirely or substantially open. In the second position of the valve body 690, the flow control orifice 696 has no cross-sectional flow area and the valve passage 692 is entirely closed or occluded by the valve body. As the valve body 690 moves from the first position to the second position, the cross-sectional flow area of the flow control orifice 696 varies in accordance with contours of the outer circumferential surface of the valve body and the surface 694 defining the valve passage 692. Although the flow control orifice 696 and the valve passage 692 may be incrementally closed off as the valve body 690 moves from the first position to the second position, the shapes of the contoured outer circumferential surface of the valve body and the surface 694 may provide the flow control orifice with a cross-sectional flow area that increases and decreases in various sequences and increments as valve body 690 moves from the first position to the second position and assumes different positions within the valve passage 692.

Fluid from the fluid chamber 672 may, therefore, flow through the metering orifice or flow control orifice 719 and through the passage 682 into the fluid control valve 652. Within the fluid control valve 652, the fluid may flow through the valve passage 692 past the valve body 690 and the flow control orifice 696. After passing through the fluid control valve 652, the fluid may flow into a reservoir (not shown). Thus, there is a fluid flow path extending from one end portion of the piston 650 lengthwise through the piston, through the metering orifice or flow control orifice 719, and through the flow control orifice 696. As can be seen, the fluid flow path is free of any recirculating portion returning fluid from downstream of the flow control orifice 696 to upstream of the flow control orifice 696. The extent to which the valve body 690 occludes or blocks the valve passage 692 in the fluid control valve 652, together with the pressure and/or flow rate of the fluid, will determine the extent to which the fluid may flow through the fluid control valve and the extent to which there will be resistance to such fluid flow through the fluid control valve.

The left end portion 691 of the valve body 690 projects from the left end of the valve housing 688 and extends through the side wall 618 to lie adjacent the outward facing surface of the side wall 618 adjacent the left end portion of the spool 614. The fluid control valve 652 is positioned such that the drive mechanism 656 couples the fluid control valve to the spool 614. As shown in FIGS. 14 and 15, the drive mechanism 656 comprises a splined or toothed extension 698 on the spool 614 and a toothed drive wheel 700 connected to the left end portion 691 of the valve body 690 of the fluid control valve 652 for rotation with the valve body. The toothed extension 698 is connected to the spool 614 such that the toothed extension and the spool rotate together. The toothed extension 698 also projects away from the outwardly facing surface of the side wall 618 of the frame 612. A gear wheel 699 is mounted on the toothed extension 298 of the spool 214 for rotation with the spool. The gear wheel 699 engages a movable idler gear assembly 711. The idler gear assembly 711 includes a first idler gear 713 and a second idler gear 715. The idler gears 713 and 715 are spaced apart and are both fixed to a gear shaft 717. The first idler gear 713 directly engages the toothed drive wheel 700 connected to the valve body 690 of the fluid control valve 652. The second idler gear 715 directly engages the gear wheel 699. The movable idler gear assembly 711 is the only connection for transferring rotational movement from the spool 614 to the valve body 690.

The drive mechanism 656 transmits rotational movement of the spool 614 to the fluid control valve 652 and, more particularly, to the valve body 690 within the fluid control valve. The toothed drive wheel 700 is connected to one end of the valve body 690. Due to the threaded connection between the outer circumferential surface 704 of the valve body 690 and the inner circumferential surface 706 of the support member 702, rotational movement of the valve body 690 produces axial movement of the valve body within the support member 702 and the valve housing 688 and within the valve passage 692. Movement of the spool 614 thus effects movement of the valve body 690 within the valve passage 692 in the fluid control valve 652 to adjust the cross-sectional flow area of the flow control orifice 696. An O-ring 709 or other seal member seals the interface between the valve housing 688 and the support member 702 and the left end portion 691 of the valve body 690 at a location adjacent the toothed drive wheel 700 and adjacent to the threaded circumferential surfaces 704 and 706.

To permit the movable idler gear assembly 711 to move out of engagement with or both the gear wheel 699 mounted on the spool 614 and the toothed drive wheel 700 connected to the valve body 690, in response, for example, to deployment of a pretensioner or pretensioner assembly 730, the idler gear assembly 711 is mounted on or connected to a pivotally mounted link 741 that engages or contacts a pivotally mounted lever 742. The link 741 and the lever 742 are mounted for pivotal movement on the side wall 618 of the frame 612 adjacent an inwardly facing surface of the side wall. The idler gear assembly 711 is mounted on the link 741 adjacent an end of the link opposite an end that engages or contacts the lever 742. More specifically, the first idler gear 713 is supported adjacent an outwardly facing surface of the side wall 620 of the frame 612. The second idler gear 715 is supported adjacent an inwardly facing surface of the side wall 620 of the frame 612 and adjacent the link 741. The idler gear shaft 717 extends through a slot formed in the side wall 620. The lever 342 is normally biased by a spring 743, such as a coil spring, to hold the idler gear assembly 711 in meshing engagement with the gear wheel 699 mounted on the spool 614 and the toothed drive wheel 700 connected to the valve body 690. When subjected to the force or pressure of an elongated flexible member or snake (not shown) used in the pretensioner assembly 730, the lever 742 is pushed to a position in which the lever pushes the link 741 in a direction opposed to the biasing force of the spring 743. Such movement of the link 741 also moves the idler gear assembly 711 out of engagement with either or both the out of engagement with either or both the toothed drive wheel 700 and the gear wheel 699 mounted on the spool 614. As a result, the valve body 690 of the fluid control valve 652 no longer moves in response to movements of the spool 614 and the size or cross-sectional flow area of the flow control orifice 696 in the fluid control valve remains fixed thereafter during subsequent operation of the fluid control valve and the locking mechanism 630.

While the piston 650 and the valve housings 288 and 688 have been described as being formed of multiple components, the piston 650 and the valve housings 288 and 688 could each be formed in one piece. In addition, while the drive mechanisms 256 and 656 have been described as being operable to decouple the valve bodies 290 and 690, respectively, from the rotatable spools 214 and 614 in response to deployment of a pretensioner 330 or 730, other mechanisms could be used to decouple or disengage the valve bodies from their respective spools. For example, movement of the pistons 250 and 650 relative to their respective cylinders 248 and 648, respectively, could be used to decouple or disengage the valve bodies 290 and 690 from their respective spools 214 and 614. Similarly, twisting movement of the torsion bars 234 and 634, respectively, could be used to decouple or disengage the valve bodies 290 and 690 from their respective spools 214 and 614.

As a further alternate embodiment of the invention, the fluid control valves 52, 252, and 652 could be eliminated from the retractors 10, 200, and 600. The retractor 10 (in its alternate embodiment shown in FIGS. 6-6B), the retractor 200, and the retractor 600 would then have a single metering orifice or flow control orifice 119, 319, and 719, respectively, through which fluid is forced. Such modified embodiments of the retractors 10, 200, and 600 could be used in situations in which the length of seat belt webbing unwound from the spools 14, 214, and 614, respectively, is not an indicator of occupant size and/or position. Thus, such modified embodiments of the retractors 10, 200, and 600 could be installed in a stationary position in a vehicle for use with a vehicle seat that can be moved forward and backward in the vehicle. Such stationary mounting of a retractor is in contrast to a retractor installed on a movable seat to move with the seat, in which case the length of seat belt webbing unwound from the retractor spool is an indicator of occupant size and/or position. Also, if a retractor is mounted in a stationary position in a vehicle for use with a vehicle seat that also is mounted so as not to move forward and backward in the vehicle, the length of seat belt webbing unwound from the retractor spools is again an indicator of occupant size and/or position.

From the above description of the invention, those skilled in the art will perceive improvements, changes and modifications. Such improvements, changes, and/or modifications within the skill of the art are intended to be covered by the appended claims.

Having described the invention, the following is claimed:

1. A seat belt retractor comprising:
   (a) a rotatable spool on which seat belt webbing is wound; and
   (b) a load-limiting system to limit a load applied to a vehicle occupant by the seat belt webbing, the load-limiting system including
      (i) a flow control orifice through which fluid is forced when a load in excess of a predetermined load is applied to the rotatable spool by the seat belt webbing, the flow control orifice having a cross-sectional flow area that is adjustable in response to unwinding of seat belt webbing from the rotatable spool prior to a crash event involving a vehicle in which the seat belt retractor is mounted, the flow control orifice ceasing to be adjustable in response to unwinding of seat belt webbing from the rotatable spool after the crash event is in progress, and
      (ii) a piston received in a cylinder, the piston and cylinder being operatively coupled to the rotatable spool such that rotation of the spool causes the piston to move relative to the cylinder, movement of the piston relative to the cylinder causing fluid to be forced through the flow control orifice.

2. The seat belt retractor according to claim 1 wherein the cross-sectional flow area of the flow control orifice is adjustable in response both to unwinding of seat belt webbing from the rotatable spool and to winding of seat belt webbing onto the rotatable spool prior to a crash event involving the vehicle in which the seat belt retractor is mounted, the flow control orifice ceasing to be adjustable in response to unwinding and winding of seat belt webbing from the rotatable spool and winding of seat belt webbing onto the rotatable spool after the crash event is in progress.

3. The seat belt retractor according to claim 1 wherein the piston is in threaded engagement with the cylinder such that relative rotation of the piston and cylinder causes axial movement of the piston relative to the cylinder, the piston and cylinder being operatively coupled to the rotatable spool such that rotation of the spool causes relative rotation of the piston and the cylinder, axial movement of the piston relative to the cylinder causing fluid to be forced through the flow control orifice.

4. The seat belt retractor according to claim 3 wherein the piston and cylinder are operatively coupled to the rotatable spool such that rotation of the spool causes relative rotation of the piston and the cylinder only upon initiation of the crash event, the piston and cylinder being free of any relative rotation in response to rotation of the spool prior to the crash event.

5. The seat belt retractor according to claim 1 further comprising a torsion bar, the torsion bar being mounted such that the torsion bar is twisted when a load in excess of a first predetermined load is applied to the rotatable spool by the seat belt webbing, fluid being forced through the flow control orifice when a load in excess of a second predetermined load is applied to the rotatable spool by the seat belt webbing.

6. The seat belt retractor according to claim 1 further comprising a metering orifice at least partially defined by a passage and a metering body projecting into the passage, the passage being formed in one of the piston and the cylinder, the metering body being formed in the other of the piston and the cylinder, the metering orifice having a cross-sectional flow area that is adjustable in response to movement of the piston relative to the cylinder, the flow control orifice being located in the piston downstream of the metering orifice such that movement of the piston relative to the cylinder causes fluid to be forced first through the metering orifice and then through the flow control orifice.

7. The seat belt retractor according to claim 1 wherein the fluid control orifice is at least partially defined by a valve passage and a valve body projecting into the valve passage, the valve body being operatively coupled to the rotatable spool such that rotation of the spool causes movement of the valve body in the valve passage, movement of the valve body in the valve passage adjusting the cross-sectional flow area of the flow control orifice.

8. The seat belt retractor according to claim 1 further comprising a pretensioner, the pretensioner being deployable so as to cause the flow control orifice to cease to be adjustable in response to unwinding of seat belt webbing from the rotatable spool after the crash event is in progress.

* * * * *